US010163342B2

(12) United States Patent
Kweon et al.

(10) Patent No.: US 10,163,342 B2
(45) Date of Patent: Dec. 25, 2018

(54) METHOD AND APPARATUS FOR TRAFFIC SAFETY

(71) Applicant: Samsung Electronics Co., Ltd., Suwon-si, Gyeonggi-do (KR)

(72) Inventors: Ki-Suk Kweon, Suwon-si (KR); Jung-Min Moon, Suwon-si (KR); Kyung-Kyu Kim, Suwon-si (KR); Young-Bin Chang, Anyang-si (KR); Jung-Soo Jung, Seongnam-si (KR)

(73) Assignee: Samsung Eelctronics Co., Ltd., Suwon-si (KR)

( * ) Notice: Subject to any disclaimer, the term of this patent is extended or adjusted under 35 U.S.C. 154(b) by 185 days.

(21) Appl. No.: 14/966,658

(22) Filed: Dec. 11, 2015

(65) Prior Publication Data

US 2016/0169688 A1 Jun. 16, 2016

(30) Foreign Application Priority Data

Dec. 12, 2014 (KR) ........................ 10-2014-0179254

(51) Int. Cl.
*G08G 1/087* (2006.01)
*G08G 1/0965* (2006.01)
(Continued)

(52) U.S. Cl.
CPC ............. *G08G 1/087* (2013.01); *G01C 21/26* (2013.01); *G08G 1/0965* (2013.01);
(Continued)

(58) Field of Classification Search
CPC ................. G08G 1/087; G08G 1/0965; G08G 1/096716; G08G 1/096741; G08G 1/096791; G08G 1/162; G01C 21/26
See application file for complete search history.

(56) References Cited

U.S. PATENT DOCUMENTS 8,773,281 B2 7/2014 Ghazarian
2007/0001871 A1* 1/2007 Pfleging ............... G08G 1/0965
340/907

(Continued)

OTHER PUBLICATIONS

Giuseppe Araniti et al.; University Mediterranea of Reggio Calabria, "LTE for Vehicular Networking: A Survey"; IEEE Communications Magazine; May 2013; pp. 148-156.

*Primary Examiner* — Hussein Elchanti
(74) *Attorney, Agent, or Firm* — Jefferson IP Law, LLP

(57) ABSTRACT

A method and apparatus for traffic safety are provided using vehicle driving-related information obtained on the basis of a transmission/reception beam pair of a road side unit (RSU) and a vehicle on-board unit (OBU), thereby reducing a probability that vehicle collisions occur where visual fields may be obscured. The method includes setting a path from a current location of the electronic device to a destination, and transmitting a message indicating an emergency situation to other devices located on the path while moving to the destination. The method further includes determining a transmission/reception beam pair of the electronic device and a road apparatus, using a reference signal received from the road apparatus, transmitting a signal including information for the transmission/reception beam pair to the road apparatus, and receiving, from the road apparatus, a message warning that the electronic device and another neighboring electronic device are approaching each other.

10 Claims, 31 Drawing Sheets

(51) Int. Cl.
*G08G 1/0967* (2006.01)
*G08G 1/16* (2006.01)
*G01C 21/26* (2006.01)

(52) U.S. Cl.
CPC . *G08G 1/096716* (2013.01); *G08G 1/096741* (2013.01); *G08G 1/096791* (2013.01); *G08G 1/162* (2013.01)

(56) References Cited

U.S. PATENT DOCUMENTS

| | | | | |
|---|---|---|---|---|
| 2008/0316055 | A1* | 12/2008 | Bachelder | F41G 9/00 340/906 |
| 2010/0153002 | A1* | 6/2010 | Lee | G01C 21/3407 701/533 |
| 2014/0354449 | A1* | 12/2014 | Alam | G08G 1/0965 340/902 |
| 2015/0033019 | A1* | 1/2015 | Oguma | H04L 9/0822 713/171 |

* cited by examiner

METHOD AND APPARATUS FOR TRAFFIC SAFETY

CROSS-REFERENCE TO RELATED APPLICATION(S)

This application claims the benefit under 35 U.S.C. § 119(a) of a Korean patent application filed on Dec. 12, 2014 in the Korean Intellectual Property Office and assigned Serial number 10-2014-0179254, the entire disclosure of which is hereby incorporated by reference.

TECHNICAL FIELD

The present disclosure relates to a method and apparatus for traffic safety.

BACKGROUND

In recent years, with the rapid development of an electronic device such as a smartphone and a tablet personal computer (PC), the electronic device, which can perform wireless voice calling and information exchange, has become a daily necessity. The electronic device has been recognized simply as a portable apparatus capable of wireless voice calling. However, with the development of the technology thereof and the introduction of wireless Internet, the electronic device has been developed into a multimedia apparatus performing functions such as scheduling, games, remote control, image photography, Internet searching, and a social network service (SNS) in addition to the wireless voice call, thereby satisfying the needs of users.

In particular, in recent years, the electronic device has provided a navigation service for the convenience of vehicle drivers. Accordingly, most of the vehicle drivers can identify a road situation and traffic information using the navigation service provided by the electronic device. However, it is difficult to cope with an emergency situation suddenly occurring on a road only using the navigation service of the related art.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a service to help a vehicle driver to cope with an emergency situation occurring on a road.

Another aspect of the present disclosure is to provide a method and apparatus for controlling a traffic situation in order to drive an emergency vehicle and providing information on an emergency situation to neighboring vehicles, in a system supporting device-to-device (D2D) communication.

Another aspect of the present disclosure is to provide a method and apparatus for controlling a traffic light on the basis of the D2D communication by an electronic device of the emergency vehicle.

Another aspect of the present disclosure is to provide a method and apparatus for notifying a neighboring vehicle of an emergency situation on the basis of the D2D communication by an electronic device of an emergency vehicle.

Another aspect of the present disclosure is to provide a method and apparatus for transmitting an emergency request message to a traffic light when an emergency vehicle enters a transmission range of the traffic light, thereby controlling the traffic light, by an electronic device of an emergency vehicle.

Another aspect of the present disclosure is to provide a method and apparatus for preferentially allocating a resource for signal transmission about an emergency situation in a D2D communication system.

Another aspect of the present disclosure is to provide a method and apparatus for providing vehicle driving-related information on the basis of a transmission/reception beam pair of a road side unit (RSU) and an on-board unit (OBU), in a system supporting millimeter wave beamforming.

In accordance with an aspect of the present disclosure, a method of controlling an electronic device for notifying of a traffic situation is provided. The method includes setting a path from a current location of an electronic device to a destination, and transmitting a message indicating an emergency situation to at least one other apparatus located on the configured path while moving to the destination.

In accordance with another aspect of the present disclosure, a method of controlling a traffic signal apparatus for notifying of a traffic situation is provided. The method includes receiving a message indicating an emergency situation from an electronic device, and controlling a traffic signal of the traffic signal control apparatus in response to the message indicating an emergency situation.

In accordance with another aspect of the present disclosure, a method of controlling a traffic server for notifying of a traffic situation is provided. The method includes receiving, from an electronic device, current location information and destination information of the electronic device, setting a path of the electronic device on the basis of the current location information and the destination information, acquiring information on at least one traffic signal control apparatus located on the path, and transmitting, to the electronic device, the path and the information on the at least one traffic signal control apparatus, wherein the traffic signal control apparatus includes at least one of a location of the at least one traffic signal control apparatus, identification information of the at least one traffic signal control apparatus, and an authentication key of the at least one traffic signal control apparatus.

In accordance with another aspect of the present disclosure, a method of controlling an electronic device for notifying of a traffic situation is provided. The method includes determining a transmission/reception beam pair of an electronic device and another device using a reference signal received from the another device, transmitting, to the another device, a signal including information on the transmission/reception beam pair, and receiving, from the another device, a message for warning that the electronic device may encounter another neighboring electronic device or are on paths to collide with each other.

In accordance with another aspect of the present disclosure, a method of controlling a road apparatus for notifying of a traffic situation is provided. The method includes receiving, from an electronic device, a first message including identification information of the electronic device and information for a transmission/reception beam pair, determining whether the electronic device approaches a road position on the basis of the identification information of the electronic device and the information for the transmission/ reception beam pair, and transmitting a message to at least one other electronic device notifying of the approaching electronic device when the electronic device is approaching the road position.

In accordance with another aspect of the present disclosure, an electronic device for notifying of a traffic situation is provided. The device includes a controller to set a path from a current location of an electronic device to a destination and transmit a message indicating an emergency situation to at least one other device located on the path while moving to the destination, and a transmission/reception unit to transmit the message indicating the emergency situation to the at least one other device.

In accordance with another aspect of the present disclosure, a traffic signal apparatus for notifying of a traffic situation is provided. The apparatus includes a transmission/reception unit to receive a message indicating an emergency situation from an electronic device, and a controller to control a traffic signal of the traffic signal apparatus in response to the message indicating the emergency situation.

In accordance with another aspect of the present disclosure, a traffic server for notifying of a traffic situation is provided. The server includes a transmission/reception unit to transmit/receive a signal to/from an electronic device, and a controller to receive, from the electronic device, current location information and destination information of the electronic device, set a path of the electronic device on the basis of the current location information and the destination information, acquire information on at least one traffic signal control apparatus located on the path, and transmit, to the electronic device, the path and the information on the at least one traffic signal control apparatus, wherein the information on the traffic signal control apparatus comprises at least one of a location of the at least one traffic signal control apparatus, identification information of the at least one traffic signal control apparatus, and authentication key of the at least one traffic signal control apparatus.

In accordance with another aspect of the present disclosure, an apparatus for notifying of a traffic situation is provided. The apparatus includes a transmission/reception unit to transmit/receive a signal to/from a road apparatus, and a controller to determine a transmission/reception beam pair of an apparatus and a road apparatus using a reference signal received from the road apparatus, transmit, from the apparatus, a signal including the information for the transmission/reception beam pair, to the road apparatus, and receive a message, from the road apparatus, warning that the apparatus and another apparatus are on paths to collide with each other.

In accordance with another aspect of the present disclosure, a road apparatus for notifying of a traffic situation is provided. The road apparatus includes a transmission/reception unit to transmit/receive a signal to/from at least one electronic device, and a controller to receive, from the electronic device, a first message including identification information of the electronic device and information for a transmission/reception beam pair, determine whether the electronic device approaches a road position, on the basis of at least one of the identification information of the electronic device and the information for the transmission/reception beam pair, and transmit a message to at least one other electronic device notifying of the approaching electronic device when the electronic device is approaching the road position.

According to an embodiment of the present disclosure, a system supporting D2D communication is provided. The system controls a traffic situation in order to drive an emergency vehicle and provides information on an emergency situation to neighboring vehicles, thereby helping the emergency vehicle safely and rapidly arrive at a destination.

Further, in an embodiment of the present disclosure, a system supporting millimeter beamforming is provided. The system provides vehicle driving-related information on the basis of a transmission/reception beam pair of an RSU and an OBU, thereby reducing a probability that a vehicle collision accident occurs in an alley or an intersection where it is difficult to ensure a visual field.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
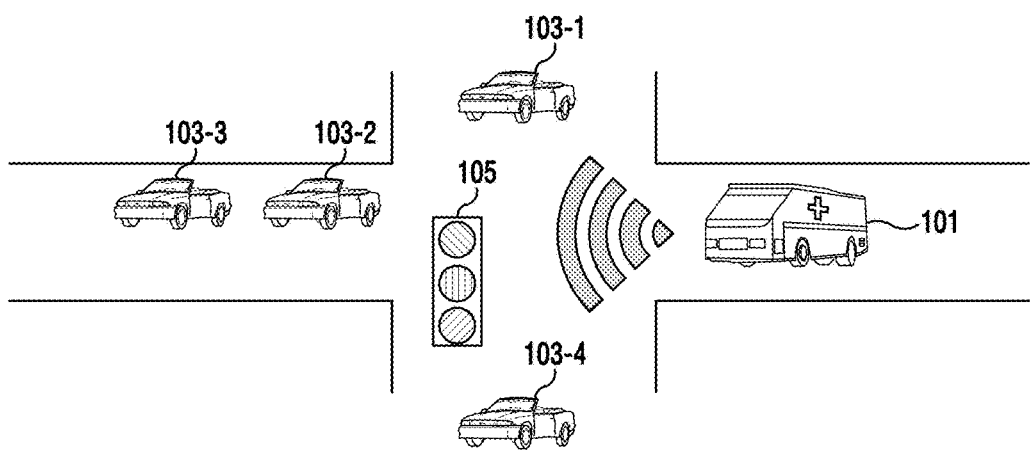
FIG. 1 illustrates an example of controlling a traffic situation in order to drive an emergency vehicle in a device-to-device (D2D) system according to an embodiment of the present disclosure.

The following description with reference to the accompanying drawings is provided to assist in a comprehensive understanding of various embodiments of the present disclosure as defined by the claims and their equivalents It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

As used herein, the expression "A or B", "at least one of A and/or B", or "one or more of A and/or B" may include any or all possible combinations of items enumerated together. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and may not be intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical appliance, a camera, and a wearable device (e.g., a head-mounted-device (HMD) such as electronic glasses, electronic clothes, an electronic bracelet, an electronic necklace, an electronic accessory, electronic tattoos, or a smart watch).

According to some embodiments, the electronic device may be a smart home appliance. The home appliance may include at least one of, for example, a television, a digital video disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device. Further, in the following description, an electronic device may correspond to an electronic device included in a vehicle, mounted on the vehicle, or attached to the vehicle.

Hereinafter, two embodiments for allowing a vehicle driver to cope with an emergency situation occurring on a road will be described.

An embodiment of the present disclosure relates to a method and apparatus for controlling a traffic situation in order to drive an emergency vehicle, provide information on an emergency situation to other neighboring vehicles, and/or allow an emergency vehicle to rapidly drive to a destination, utilizing a wireless communication system. An electronic device of an emergency vehicle, an electronic device of another vehicle, and a traffic light according to an embodiment of the present disclosure can perform device-to-device (D2D) communication. Hereinafter, an embodiment described below can be equally applied to a case where a communication scheme other than the D2D communication is used.

An embodiment of the present disclosure relates to a method and apparatus for providing vehicle driving-related information on the basis of a transmission/reception beam pair of a road side unit (RSU) and an electronic device (or an on-board unit (OBU)) of a vehicle, and reducing a probability that a vehicle collision accident occurs in an alley, etc. where it is difficult to ensure a visual field. The RSU and the electronic device of the vehicle according to an embodiment of the present disclosure can perform millimeter wave beamforming communication but embodiments are not limited thereto.

FIG. 1 illustrates an example of controlling a traffic situation in order to drive an emergency vehicle in a D2D system according to an embodiment of the present disclosure.

In an embodiment of the present disclosure, an emergency vehicle may include an ambulance, fire truck, police car, or any other car, truck, motorcycle, boat, aircraft, bicycle, Segway-type device, and/or horse used for an official duty where emergency responses occur.

Referring to FIG. 1, a traffic situation may include an emergency vehicle 101, other vehicles 103-1 to 103-4, and a traffic light 105. An electronic device of the emergency vehicle 101 can notify an emergency situation to electronic devices of the other vehicles 103-1 to 103-4 and the traffic light 105 located on a path to a destination of the emergency vehicle when the emergency situation occurs. Here, the electronic device may imply an electronic device which may be included in and mounted to a vehicle. For example, the electronic device may include a navigation device in a vehicle, a portable electronic device owned by a driver, or an electronic device mounted to a chassis.

When an emergency situation occurs, the electronic device of the emergency vehicle 101 can transmit a message notifying an emergency situation to electronic devices of other vehicles 103-1 to 103-4 located on a path to a destination of the emergency vehicle 101 and to the traffic light 105 to notify the emergency situation to drivers of the other vehicles 103-1 to 103-4, and control a signal of the traffic light 105 to allow the emergency vehicle 101 to rapidly drive to the destination. For example, in order to ensure an open driving lane on the path to the destination, the electronic device of the emergency vehicle 101 can transmit a message notifying of the emergency situation to the electronic devices of other vehicles 103-1 to 103-4 located on the path to the destination of the emergency vehicle 101 and induce the other vehicles 103-1 to 103-4 to adjust positions and/or speeds to open the driving lane for passage by the emergency vehicle 101. Further, in order to minimize a signal standby time of the emergency vehicle 101, the electronic device of the emergency vehicle 101 can transmit the message notifying of an emergency situation, to at least one traffic light 105 located on the path to the destination of the emergency vehicle 101, to induce the traffic light 105 to control a signal to open the driving lane for passage by the emergency vehicle 101.

Figure 2:
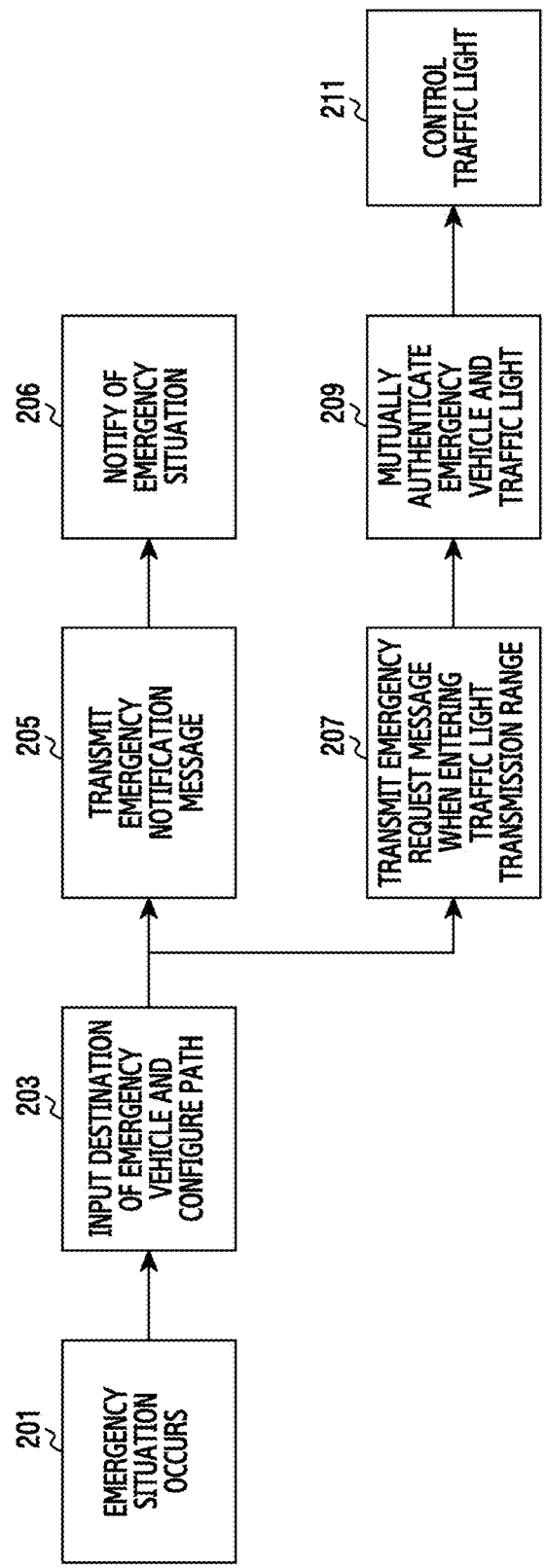
FIG. 2 illustrates a procedure of controlling a traffic situation in order to drive an emergency vehicle according to an embodiment of the present disclosure.

FIG. 2 illustrates a procedure of controlling a traffic situation in order to drive an emergency vehicle according to an embodiment of the present disclosure.

Referring to FIG. 2, an electronic device of an emergency vehicle can detect that an emergency situation occurs in operation 201. For example, when the emergency vehicle is an ambulance, if an input is received from a driver of the ambulance, an electronic device within the ambulance can detect that an emergency situation occurs.

The electronic device of the emergency vehicle can receive a destination of the emergency vehicle and set a path to the input destination in operation 203. For example, the electronic device of the emergency vehicle can receive an input that the destination of the emergency vehicle is a first destination, and set a path from a current location to the first destination.

The electronic device of the emergency vehicle can periodically, aperiodically, or when controlled to do so, transmit an emergency notification message in operation 205. According to an embodiment of the present disclosure, the electronic device of the emergency vehicle can periodically or aperiodically transmit the emergency notification message notifying of the occurrence of an emergency situation, to electronic devices of other vehicles located on the path of the emergency vehicle.

Figure 3:
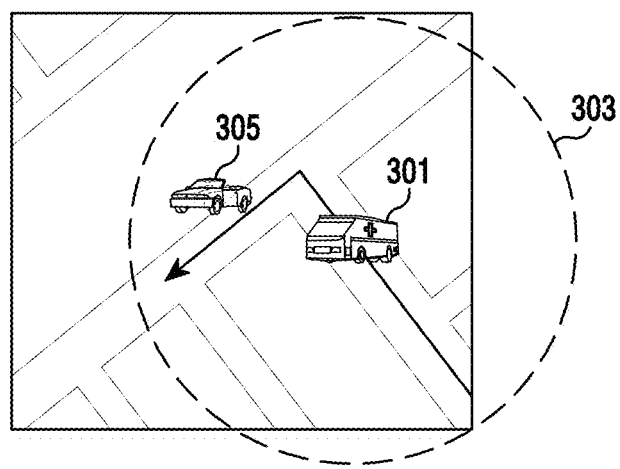
FIG. 3 illustrates an example of transmitting an emergency notification message from an electronic device of an emergency vehicle to an electronic device of another vehicle according to an embodiment of the present disclosure.

FIG. 3 illustrates an example of transmitting an emergency notification message from an electronic device of an emergency vehicle to an electronic device of another vehicle according to an embodiment of the present disclosure.

Referring to FIG. 3, an electronic device of an emergency vehicle 301 periodically or aperiodically broadcasts the emergency notification message, so that an electronic device of another vehicle 305 located within a transmission range 303 of a signal (or message) of an electronic device of the emergency vehicle 301 can receive the emergency notification message. The emergency notification message may include speed information, current location information, and path information of the emergency vehicle.

In operation 206, the electronic device of the another vehicle, which has received the emergency notification message from the electronic device of the emergency vehicle, can notify a user of the other vehicle of an emergency situation. For example, the electronic device of the another vehicle can display, on a screen thereof, a message indicating that the emergency vehicle is approaching a path of the another vehicle, or can output an audio signal indicating that the emergency vehicle is approaching the path of the another vehicle.

Figure 4:
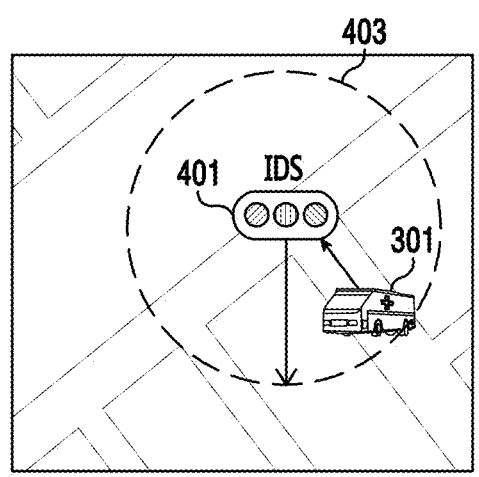
FIG. 4 illustrates an example of transmitting an emergency message from an electronic device of an emergency vehicle to a traffic light according to an embodiment of the present disclosure.

FIG. 4 illustrates an example of transmitting an emergency message from an electronic device of an emergency vehicle to a traffic light according to an embodiment of the present disclosure.

Figure 5:
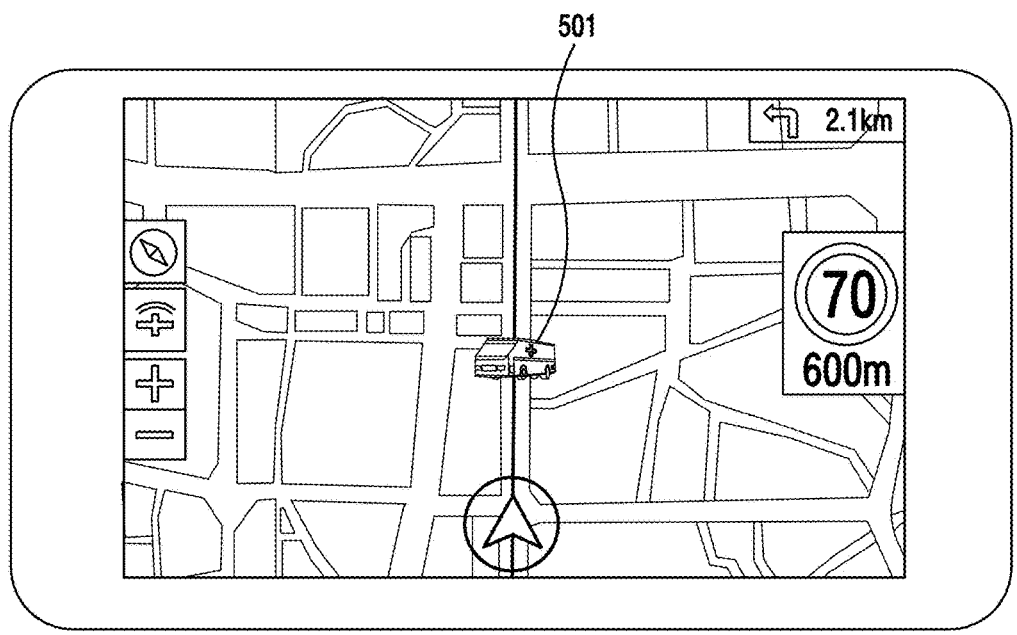
FIG. 5 illustrates an example of providing notification information on an emergency vehicle when receiving an emergency notification message from an electronic device of another vehicle according to an embodiment of the present disclosure.

FIG. 5 illustrates an example of providing notification information on an emergency vehicle when receiving an emergency notification message from an electronic device of another vehicle according to an embodiment of the present disclosure.

Referring to FIGS. 4 and 5, the electronic device of the another vehicle, which has received the emergency notification message, can display location information 501 of the emergency vehicle within the path of the another vehicle as illustrated in FIG. 5.

Further, the electronic device of the emergency vehicle can transmit an emergency request message when entering a traffic light transmission range in operation 207. For example, at a time point when a distance between the electronic device of the emergency vehicle and the traffic light is within the traffic light transmission range, the electronic device of the emergency vehicle can transmit the emergency request message for controlling a signal of the traffic light. The traffic light transmission range can be configured on the basis of a transmittable range of a signal and/or a transmittable range of a signal of the electronic device of the emergency vehicle. For example, when the electronic device of the emergency vehicle enters the transmission range of the first traffic light, the electronic device of the emergency vehicle can transmit the emergency request message to the first traffic light in order to control a signal of the first traffic light. The electronic device of the emergency vehicle transmits the emergency request message when entering the transmission range of the traffic light to prevent energy from being wasted due to indiscriminate transmission of the emergency request message. For example, the electronic device of the emergency vehicle 301 can transmit the emergency request message to the corresponding traffic light 401 when entering the transmittable range 403 of a signal of the traffic light 401, as illustrated in FIG. 4. The emergency request message according to an embodiment of the present disclosure may include speed information, current location information, path information, emergency service type information (e.g., type information indicating medical emergency, fire emergency, public safety, a ceremony vehicle, etc.), a traffic identification (ID) corresponding to a target of the emergency request message, and traffic light authentication information (e.g., a random number and an authentication token) of the emergency situation.

The electronic device of the emergency vehicle and the traffic light can perform mutual authentication in operation 209. For example, the electronic device of the emergency vehicle can perform a mutual authentication procedure with the traffic light in order to control the signal of the traffic light. At this time, the mutual authentication between the electronic device of the emergency vehicle and the traffic light may be performed on the basis of the emergency request message. The description therefor will be described below with reference FIG. 9.

In operation 211, the traffic light, which has received the emergency request message from the electronic device of the emergency vehicle, can control the signal thereof. Further, the traffic light can control displays (e.g., a stop display, a progress display, a caution display, etc.) of the traffic signal to enable the emergency vehicle approaching a transmission range thereof to drive without waiting for a signal. For example, the traffic light can display a green light indicating the progress display, on a driving path of the emergency vehicle, which has transmitted the emergency request message. At this time, the traffic light located on other adjacent paths rather than the driving path of the emergency vehicle can display a red light indicting the stop display to vehicles and/or pedestrians.

Figure 6:
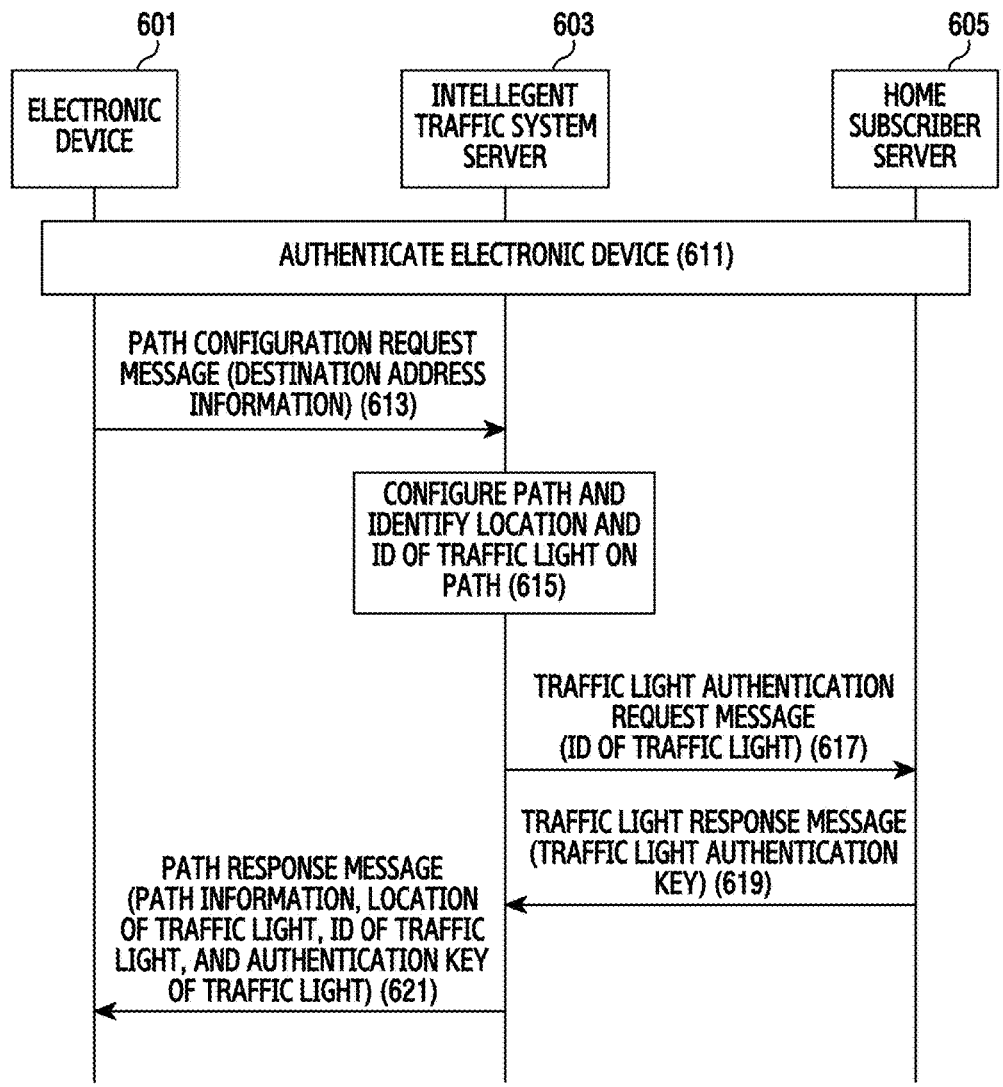
FIG. 6 is a signal flow diagram illustrating a procedure of setting a path by an electronic device of an emergency vehicle according to an embodiment of the present disclosure.

FIG. 6 is a signal flow diagram illustrating a procedure of setting a path by an electronic device of an emergency vehicle according to an embodiment of the present disclosure.

Referring to FIG. 6, when an emergency situation occurs, in order to control a traffic light and other vehicles located on a path to a destination, an electronic device 601 of an emergency vehicle can be authenticated by a home subscriber server (HSS) 605 through an intelligent transportation system (ITS) server 603 in operation 611.

When the electronic device 601 of the emergency vehicle is authenticated by the HSS 605, the electronic device 601 of the emergency vehicle can transmit a path setting request message to the ITS server 603 in operation 613. The electronic device 601 of the emergency vehicle can transmit the path setting request message including destination address information of an emergency vehicle to the ITS server 603 when an emergency situation occurs. For example, in a case of the ambulance transporting an emergency patient, a driver of the ambulance inputs address information of a hospital as destination address information, and the electronic device 601 of the ambulance, which has received the input of the destination address information, can transmit the path setting request message, which is targeted as the corresponding destination, to the ITS server 603. The path setting request message including destination address information of an emergency vehicle may also originate elsewhere, such as from an emergency dispatcher (e.g., a 911 dispatcher), and be automatically sent to the ITS server 603 when an emergency situation occurs.

The ITS server 603, which has received the path setting request message, can set a path from a current location of the electronic device 601 of the emergency vehicle to the destination thereof (or a path of the emergency vehicle) and identify locations of the traffic lights located on the set path and an ID of each traffic light in operation 615. According to an embodiment of the present disclosure, the ITS server 603 can set the path of the current location of the electronic device 601 of the emergency vehicle to the destination thereof, and identify the location and the ID of each traffic light located on the set path. Here, each traffic light may have a unique ID.

Figure 7:
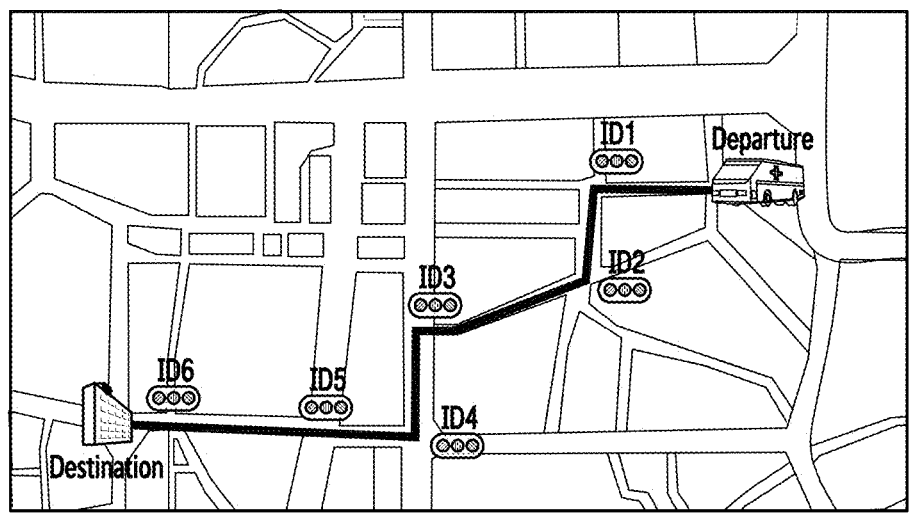
FIG. 7 illustrates an example of identifying a traffic light located on a path when the path is set by an electronic device of an emergency vehicle according to an embodiment of the present disclosure.

FIG. 7 illustrates an example of identifying a traffic light located on a path when the path is set by an electronic device of an emergency vehicle according to an embodiment of the present disclosure.

Referring to FIG. 7, the ITS server 603 can identify a location and an ID of each of six traffic lights when the six traffic lights are located on the path of the electronic device 601 of the emergency vehicle.

Thereafter, the ITS server 603 can transmit a traffic light authentication request message to the HSS 605 in operation 617. According to an embodiment of the present disclosure, the ITS server 603 can transmit, to the HSS 605, the traffic light authentication request message including ID information of each of the traffic lights located on the path. For example, when there are six traffic lights on the path of the electronic device 601 of the emergency vehicle, the ITS server 603 can transmit, to the HSS 605, the traffic light authentication request message including the ID information of each of the six traffic lights.

Thereafter, the HSS 605 can transmit, to the ITS server 603, a traffic light authentication response message in response to the traffic light authentication request message in operation 619. For example, the HSS 605 can transmit, to the ITS server 603, the traffic light authentication response message including an authentication key of each traffic light located on the path of the electronic device 601 of the emergency vehicle. At this time, the HSS 605 can generate an authentication key used for mutual authentication between the electronic device 601 of the emergency vehicle and the traffic light.

Figure 8:
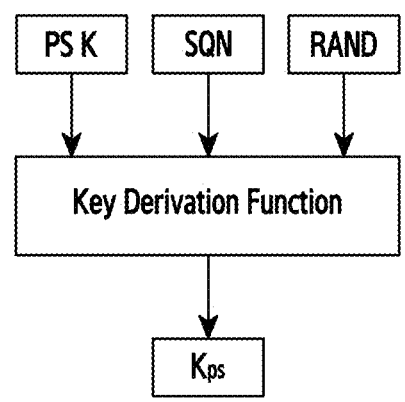
FIG. 8 illustrates an example of generating a traffic light authentication key by a home subscriber server (HSS) according to an embodiment of the present disclosure.

FIG. 8 illustrates an example of generating a traffic light authentication key by a HSS according to an embodiment of the present disclosure.

For example, the HSS 605 can generate an authentication key $K_{ps}$ through a key derivation function having, as inputs, a master key (PS K), a random number RAND generated by the HSS 605, and a sequence number SQN generated by the HSS 605, as illustrated in FIG. 8. According to an embodiment of the present disclosure, different authentication keys may be generated using different master keys according to traffic lights, respectively, and the same authentication key may be generated using the same master key with respect to all traffic lights.

Thereafter, the ITS server 603 can transmit, to the electronic device 601 of the emergency vehicle, a path response message in response to the path setting request message in operation 621. According to an embodiment of the present disclosure, the ITS server 603 can transmit, to the electronic device 601 of the emergency vehicle, the path response message including path information of the electronic device 601 of the emergency vehicle, a location of each of traffic lights located on the corresponding path, an ID of each of the traffic lights located on the corresponding path, and/or a traffic light authentication key for each of the traffic lights located on the corresponding path.

Figure 9:
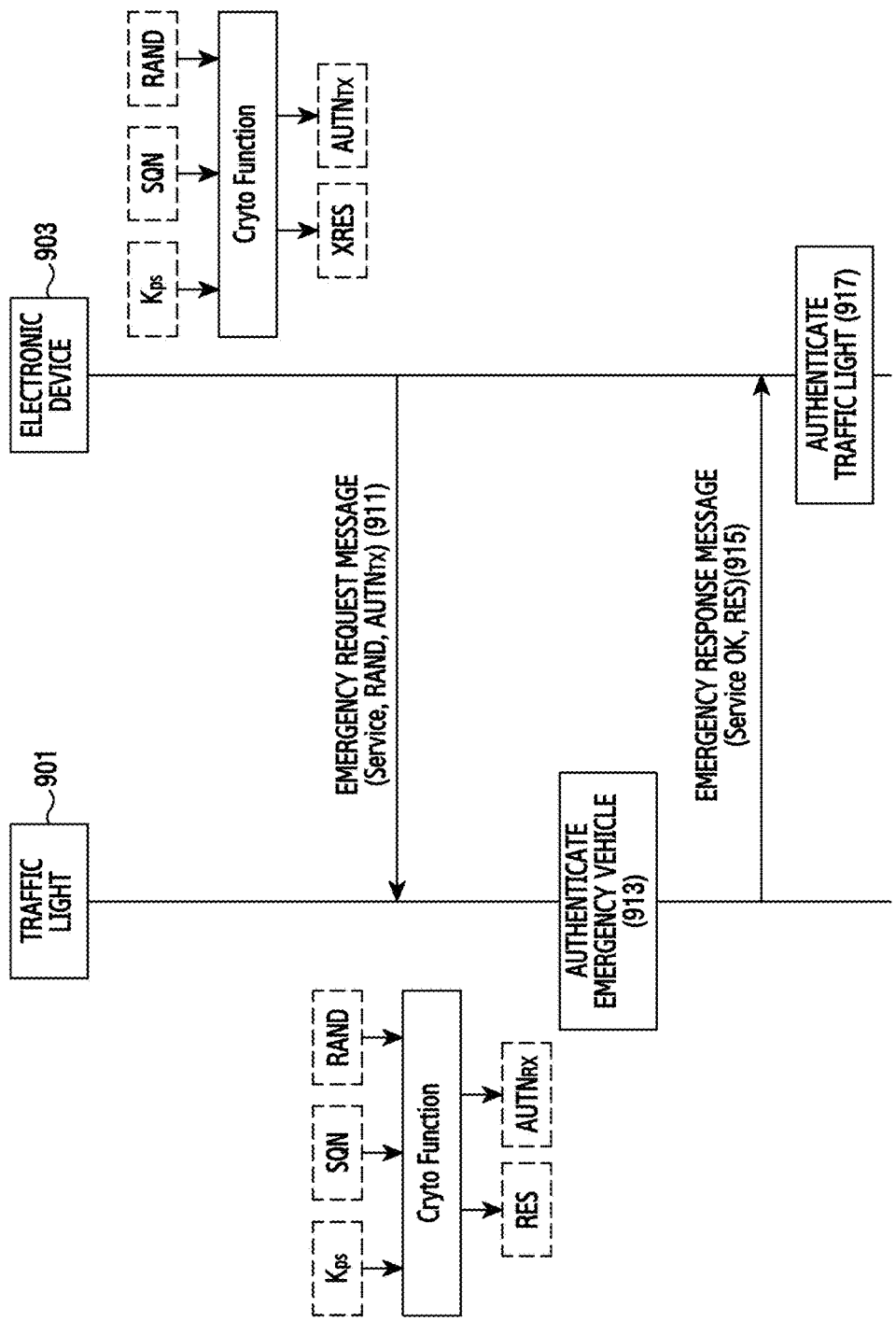
FIG. 9 is a signal flow diagram illustrating a procedure of authenticating an electronic device of an emergency vehicle according to an embodiment of the present disclosure.

FIG. 9 is a signal flow diagram illustrating a procedure of authenticating an electronic device of an emergency vehicle according to an embodiment of the present disclosure.

Referring to FIG. 9, an electronic device 903 of an emergency vehicle can perform a mutual authentication procedure with a traffic light 901 to control signal display of the traffic light 901 when entering a transmission range of the traffic light 901.

First, the electronic device 903 of the emergency vehicle can generate an expectation response XRES and a transmission-side authentication token $AUTN_{TX}$ through a cryptographic function having, as inputs, the traffic light authentication key $K_{ps}$ received from the HSS, the random number RAND generated by the electronic device 903 of the emergency vehicle and the sequence number SQN generated by the electronic device 903 of the emergency vehicle. Here, the electronic device 903 of the emergency vehicle can generate the expectation response XRES and the transmission-side authentication token for each of traffic lights using different traffic light authentication keys for each of the traffic lights.

Thereafter, the electronic device 903 of the emergency vehicle can transmit an emergency request message to the traffic light 901 when entering the transmission range of the traffic light 901 in operation 911. For example, when entering the transmission range of the traffic light 901, the electronic device 903 of the emergency vehicle can transmit, to the traffic light 901, the emergency request message additionally including service information for requesting a signal display control, the random number, and the transmission-side authentication token $AUTN_{TX}$ of the traffic light 901. The emergency request message may include speed information, current location information, path information, and/or emergency service type information (e.g., type information indicating medical emergency, fire emergency, public safety, a ceremony vehicle, etc.) of the emergency vehicle, and a traffic ID corresponding to a target of the emergency request message, and may additionally include the random number and the transmission-side authentication token $AUTN_{TX}$ as traffic light authentication information for traffic light authentication. At this time, the transmission-side authentication token may include a sequence number used as an input of the cryptographic function by the electronic device 903 of the emergency vehicle.

The traffic light 901 can authenticate the electronic device 903 of the emergency vehicle on the basis of the authentication key $K_{ps}$ previously received from an HSS and the emergency request message received from the electronic device 903 of the emergency vehicle in operation 913. For example, the traffic light 901 can generate a response RES necessary for mutual authentication and a reception-side authentication token $AUTN_{RX}$ using the cryptographic function having, as inputs, the authentication key $K_{ps}$ previously received from the HSS, an input random number received from the electronic device 903 of the emergency vehicle, and a sequence number included in the transmission-side authentication token received from the electronic device 903 of the emergency vehicle. At this time, the traffic light 901 can authenticate the electronic device 903 of the emergency vehicle by identifying whether the generated reception-side authentication token $AUTN_{RX}$ and the transmission-side authentication token $AUTN_{TX}$ received from the electronic device 903 of the emergency vehicle are identical to each other. When the reception-side authentication token $AUTN_{RX}$ and the transmission-side authentication token $AUTN_{TX}$ are identical to each other, the traffic light 901 can authenticate the electronic device 903.

Thereafter, the traffic light 901 can transmit an emergency response message to the electronic device 903 of the emergency vehicle in response to the emergency request message in operation 915. For example, the electronic device 903 of the emergency vehicle can transmit, to the electronic device 903 of the emergency vehicle, the emergency response message including service response information (Service OK) corresponding to information indicating that a signal of the traffic light 901 is successfully controlled, and a response RES.

Thereafter, the electronic device 903 of the emergency vehicle can authenticate the traffic light 901 on the basis of the response RES received from the traffic light 901 and the expectation response XRES generated by the electronic device 903 of the emergency vehicle in operation 917. At this time, the electronic device 903 of the emergency vehicle can authenticate the traffic light 901 by identifying whether the response RES received from the traffic light 901 and the expectation response XRES generated by the electronic device 903 of the emergency vehicle are identical to each other. When the response RES received from the traffic light 901 and the expectation response XRES generated by the electronic device 903 of the emergency vehicle are identical to each other, the electronic device 903 of the emergency vehicle can authenticate the traffic light 901.

Figure 10:
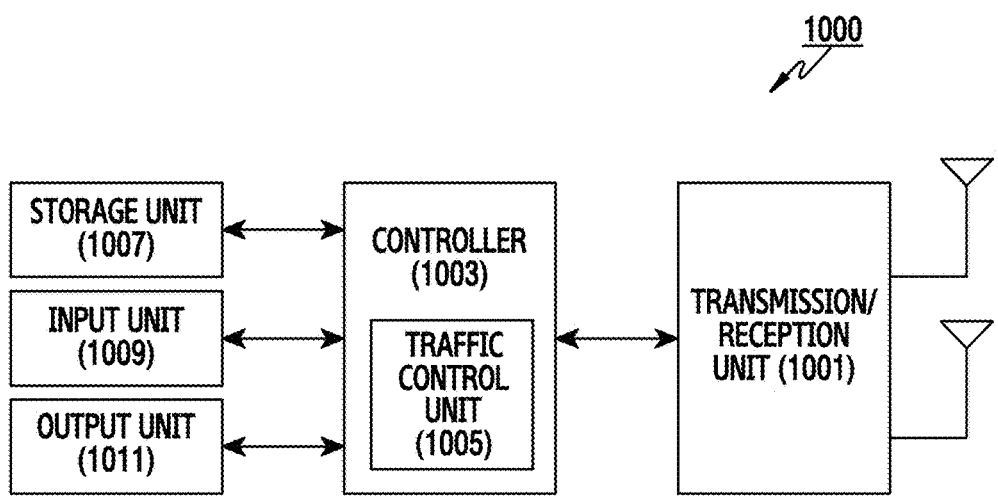
FIG. 10 is a block diagram illustrating an electronic device of an emergency vehicle according to an embodiment of the present disclosure.

FIG. 10 is a block diagram illustrating an electronic device of an emergency vehicle according to an embodiment of the present disclosure.

Referring to FIG. 10, an electronic device 1000 of an emergency vehicle may include a transmission/reception unit 1001, a controller 1003, a storage unit 1007, an input unit 1009, an output unit 1011, and one or more antenna.

The transmission/reception unit 1001 can transmit/receive a signal to/from an electronic device of at least one other vehicle and a traffic light. For example, the transmission/reception unit 1001 can transmit/receive a signal to/from the electronic device of the at least one other vehicle and the traffic light on the basis of D2D communication. In addition, the transmission/reception unit 1001 can communicate with the ITS server 603 and the HSS 605.

The controller 1003 can control and process an overall operation of the electronic device 1000. Further, the controller 1003 may include a traffic control unit 1005 according to embodiments of the present disclosure, so as to perform functions of detecting an occurrence of an emergency situation on the basis of a user input and controlling the traffic light and other vehicles located on the path to the destination. For example, the traffic control unit 1005 can control a function for performing an authentication procedure of the electronic device 1000 through the HSS. Here, the authentication procedure of the electronic device 1000 can be performed on the basis of identification information of the electronic device 1000 or information input by a user. When the authentication procedure of the electronic device 1000 is successfully completed, the traffic control unit 1005 performs a function of acquiring information on the destination and acquiring information on the path from the current location to the destination, on the basis of user input received through the input unit 1009. For example, the traffic control unit 1005 can transmit, to an ITS server, a path setting request message including current location information and/or destination address information, and receive, from the ITS server, a path response message including path information from a current location to a destination, a location of each of traffic lights located on the path from the current location to the destination, an ID of each of the traffic lights located on the path from the current location to the destination, and a traffic light authentication key for each of the traffic lights located on the path from the current location to the destination, in response thereto.

In addition, after acquiring the information on the path from the current location to the destination, the traffic control unit 1005 can control a function of periodically or aperiodically broadcasting an emergency notification message while the electronic device 1000 moves to the destination. For example, the traffic control unit 1005 can broadcast, to electronic devices of other neighboring vehicles, the emergency notification message notifying of occurrence of an emergency situation at every predetermined period while the emergency vehicle moves to the destination. According to an embodiment of the present disclosure, the emergency notification message may include speed information, current location information, and/or path information of the emergency vehicle.

In addition, after acquiring the information on the path from the current location to the destination, the traffic control unit 1005 can detect whether the emergency vehicle enters the traffic light transmission range, and whether to transmit the emergency request message to the traffic light when entering the traffic light transmission range. For example, the traffic control unit 1005 can determine whether the electronic device 1000 enters the traffic light transmission range on the basis of location information and traffic light transmission range information of each of the traffic lights located on the path from the current location to the destination and current location information of the electronic device 1000.

According to embodiments of the present disclosure, the traffic light transmission range can be configured on the basis of a transmittable range of a signal and/or a transmittable range of a signal of the electronic device of the emergency vehicle. Further, according to embodiments, the traffic light transmission range may be configured in the electronic device 1000 in advance or may be acquired from the ITS server when the path information from the current location to the destination is acquired. The traffic light transmission range may be different according to each traffic light, or may be identical with respect to all traffic lights. The traffic control unit 1005 controls and processes a function of transmitting an emergency request message to the corresponding traffic light when it is determined that the electronic device 1000 enters the traffic light transmission range. In addition, the traffic control unit 1005 can generate a transmission-side authentication token on the basis of the traffic light authentication key acquired from the ITS server for authentication with the traffic light, include, in the emergency request message, the generated transmission-side authentication token and a random number used when the transmission-side authentication token is generated, and transmit the emergency request message. When receiving an emergency response message from the traffic light in response to the emergency request message, the traffic control unit 1005 can detect that the authentication with the traffic light is successfully completed.

In addition, when the emergency notification message is received from an electronic device of another emergency vehicle in a state in which an occurrence of an emergency situation of the electronic device 1000 is not detected, the traffic control unit 1005 can perform a function of notifying a user that another emergency vehicle exists nearby. For example, when the emergency notification message is received from the electronic device of the another emergency vehicle, the traffic control unit 1005 can direct the display of location information 501 of the another emergency vehicle which has transmitted the emergency notification message or direct the output of an audio signal indicating that the other emergency vehicle exists nearby.

The storage unit 1007 stores various programs and data for an overall operation of the electronic device 1000. The storage unit 1007 can store a command or data which is received from or generated by the controller 1003 or other components. The storage unit 1007 according to an embodiment of the present disclosure can store the path information received from the ITS server 603. At this time, the received path information may include the path information from the current location to the destination, the location of each of the traffic lights located on the path from the current location to the destination, the ID of each of the traffic lights located on the path from the current location to the destination, the traffic light authentication key for each of the traffic lights located on the path from the current location to the destination, etc.

The storage unit 1007 may be a memory including programming modules such as a kernel, middle ware, an application programming interface (API), an application, etc. According to an embodiment of the present disclosure, each of the programming modules may be configured by software, firmware, hardware, or a combination of two or more thereof.

The input unit 1009 provides, to the controller 1003, data input from a user of the electronic device 1000. For example, the input unit 1009 may include a keypad including at least one key button, a touch pad or touch sensor for detecting a touch input of a user, a microphone for receiving input of voice of a user, a physical function key button mapped to a specific function, etc. The input unit 1009 according to an embodiment of the present disclosure can acquire, from a user, the information on the destination (e.g., destination address information, destination name information, etc.).

The output unit 1011 can display various pieces of information and graphical elements generated during an operation of the electronic device 1000 or output an audio signal. According to an embodiment of the present disclosure, the output unit 1011 can include a display for displaying the command or data received from the controller 1003 or the other components. For example, the output unit 1011 can display a screen on which an input of the destination of the electronic device 1000 is required and display a map indicating the path from the current location of the electronic device 1000 to the destination thereof. Further, the output unit 1011 can display a map indicating a location of the emergency vehicle. In addition, the output unit 1011 can include an audio output unit for outputting, as an audio signal, the command or data received from the controller 1003 or the other components. For example, the output unit 1011 can output an audio signal indicating that another emergency vehicle exists nearby.

Figure 11:
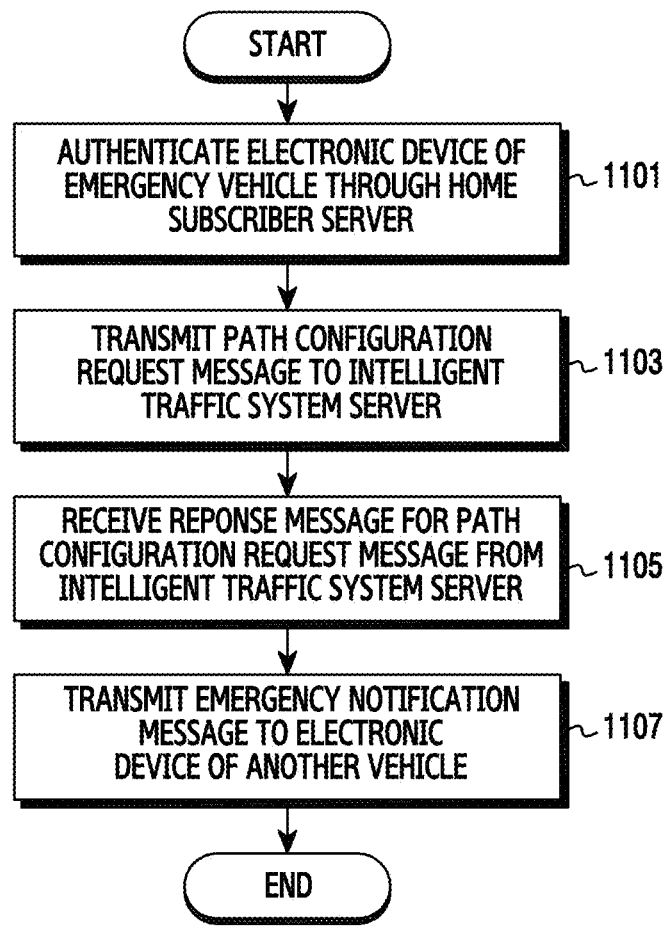
FIG. 11 is a flowchart illustrating a procedure of transmitting an emergency notification message from an electronic device of an emergency vehicle to an electronic device of another vehicle according to an embodiment of the present disclosure.

FIG. 11 is a flowchart illustrating a procedure of transmitting an emergency notification message from an electronic device of an emergency vehicle to an electronic device of another vehicle according to an embodiment of the present disclosure.

Referring to FIG. 11, the electronic device 1000 of the emergency vehicle can perform an authentication procedure of the electronic device 1000 through the HSS, in operation 1101. For example, when an occurrence of an emergency situation is detected on the basis of a user input, the electronic device 1000 of the emergency vehicle can perform, through the HSS, an authentication procedure on whether the electronic device 1000 is an electronic device having a regulatory and/or control right for the traffic light and the other vehicles located on the path to the destination. Here, the performing of the authentication procedure by the electronic device 1000 is for preventing the traffic light and the other vehicles from being controlled by an electronic device not having the regulatory and/or control right for the traffic light and the other vehicles. According to an embodiment of the present disclosure, the authentication procedure of the electronic device 1000 may be performed on the basis of identification information of the electronic device 1000 or information input by a user. The authentication procedure of the electronic device 1000 is not limited thereto, and may be performed using other pieces of information.

The electronic device 1000 of the emergency vehicle transmits the path setting request message to the ITS server in operation 1103. For example, the electronic device 1000 of the emergency vehicle can receive, from a user, an input of the information on the destination and transmit, to the ITS server, the path setting request message including the current location information and the destination address information.

The electronic device 1000 of the emergency vehicle receives the path setting request message from the ITS server in operation 1105. For example, the electronic device of the emergency vehicle can receive, from the ITS server, the path response message including the path information from the current location to the destination, the location of each of the traffic lights located on the path from the current location to the destination, the ID of each of the traffic lights located on the path from the current location to the destination, and/or the traffic light authentication key for each of the traffic lights located on the path from the current location to the destination.

The electronic device 1000 of the emergency vehicle periodically or aperiodically transmits the emergency notification message to the electronic device of the another vehicle in operation 1107. For example, the electronic device 1000 of the emergency vehicle can periodically or aperiodically transmit the emergency notification message to another neighboring electronic device while moving from the current location to the destination.

Thereafter, the electronic device 1000 of the emergency vehicle can terminate the embodiment of the present disclosure.

Figure 12:
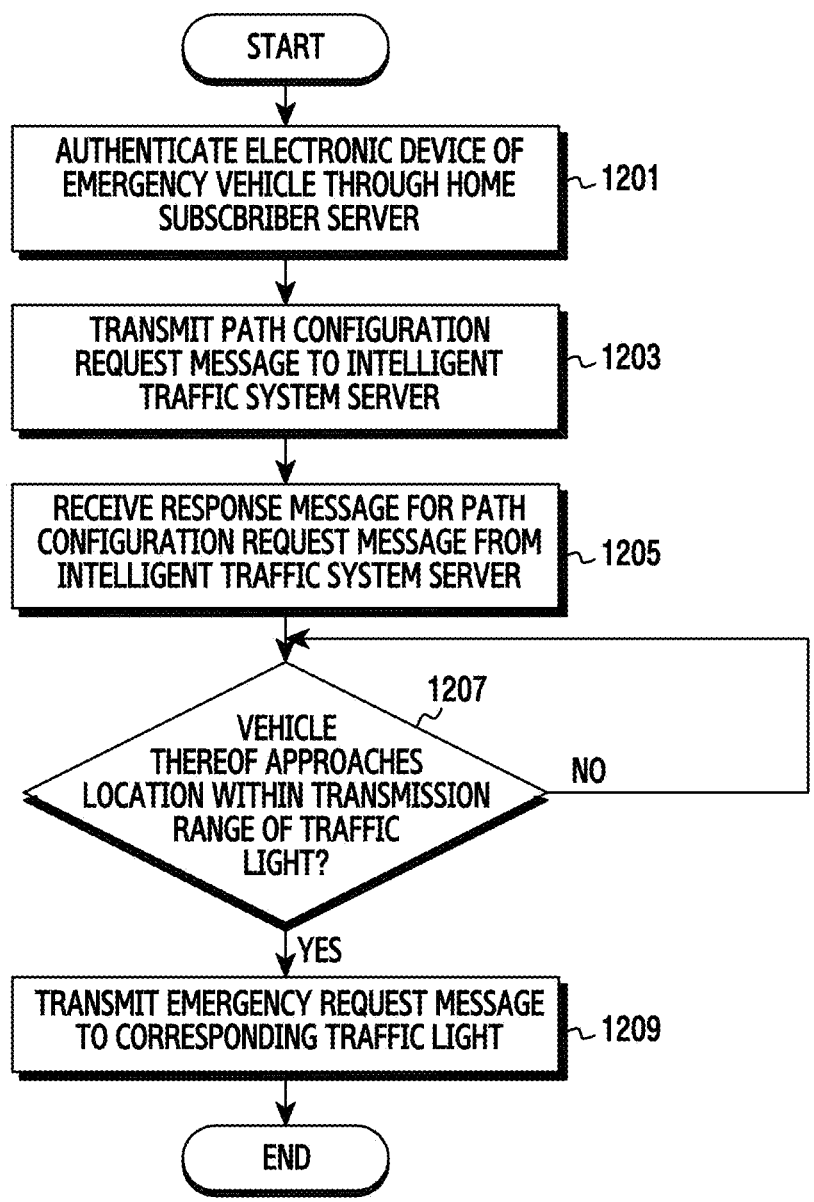
FIG. 12 is a flowchart illustrating a procedure of transmitting an emergency request message from an electronic device of an emergency vehicle to a traffic light according to an embodiment of the present disclosure.

FIG. 12 is a flowchart illustrating a procedure of transmitting an emergency request message from an electronic device of an emergency vehicle to a traffic light according to an embodiment of the present disclosure.

Referring to FIG. 12, the electronic device 1000 of the emergency vehicle can perform an authentication procedure of the electronic device 1000 through the HSS in operation 1201. For example, when occurrence of an emergency situation is detected on the basis of a user input, the electronic device 1000 of the emergency vehicle can perform, through the HSS, an authentication procedure on whether the electronic device 1000 is an electronic device having a regulatory and/or control right for the traffic light and the other vehicles located on the path to the destination. Here, the performing of the authentication procedure by the electronic device 1000 is for preventing the traffic light and the other vehicles from being controlled by an electronic device not having the regulatory and/or control right for the traffic light and the other vehicles. According to an embodiment of the present disclosure, the authentication procedure of the electronic device 1000 may be performed on the basis of identification information of the electronic device 1000 or information input by a user. The authentication procedure of the electronic device 1000 is not limited thereto, and may be performed using other pieces of information.

The electronic device 1000 of the emergency vehicle transmits the path setting request message to the ITS server in operation 1203. For example, the electronic device 1000 of the emergency vehicle can receive, from a user, an input of the information on the destination and transmit, to the ITS server, the path setting request message including the current location information and the destination address information.

The electronic device 1000 of the emergency vehicle receives the path setting request message from the ITS server in operation 1205. For example, the electronic device 1000 of the emergency vehicle can receive, from the ITS server, the path response message including the path information from the current location to the destination, the location of each of the traffic lights located on the path from the current location to the destination, the ID of each of the traffic lights located on the path from the current location to the destination, and/or the traffic light authentication key for each of the traffic lights located on the path from the current location to the destination.

The electronic device 1000 of the emergency vehicle detects whether the vehicle thereof approaches a location within the traffic light transmission range in operation 1207, and when it is detected that the vehicle thereof approaches the location within the traffic light transmission range, transmits the emergency request message to the corresponding traffic light in operation 1209. For example, the electronic device 1000 of the emergency vehicle can determine whether the electronic device 1000 enters the traffic light transmission range while moving from the current location to the destination, and when it is determined that the electronic device 1000 enters the traffic light transmission range, transmits the emergency request message to the traffic light. According to an embodiment of the present disclosure, the electronic device 1000 of the emergency vehicle can detect whether the electronic device 1000 approaches a location within the traffic light transmission range, using the following Equation 1.

$$D2D\ \text{Trasmission Range} > \sqrt{\text{Location of Car}^2 + \text{Location of Traffic Signal}^2} \qquad \text{Equation 1}$$

In Equation 1, "D2D transmission range" may indicate a traffic light transmission range, "Location of Car" may indicate a location of an emergency vehicle, and "Location of Traffic Signal" may indicate a location of a traffic light.

As another example, the electronic device 1000 of the emergency vehicle can determine whether the electronic device 1000 enters the traffic light transmission range on the basis of the location information and the traffic light transmission range information of each of the traffic lights located on the path from the current location to the destination and the current location information of the electronic device 1000. According to embodiments, the traffic light transmission range can be configured on the basis of a transmittable range of a signal and/or a transmittable range of a signal of the electronic device of the emergency vehicle. Further, according to embodiments, the traffic light transmission range may be configured in the electronic device 1000 in advance or may be acquired from the ITS server when the path information from the current location to the destination is acquired. The traffic light transmission range may be different according to each traffic light, or may be identical with respect to all traffic lights. In addition, the electronic device 1000 of the emergency vehicle can generate a transmission-side authentication token on the basis of the traffic light authentication key previously acquired for authentication with the traffic light, include, in the emergency request message, the generated transmission-side authentication token and a random number used when the transmission-side authentication token is generated, and transmit the emergency request message. Thereafter, the electronic device 1000 of the emergency vehicle can terminate the embodiment of the present disclosure.

As described above, the example where the electronic device 1000 of the emergency vehicle transmits the emergency notification message to another neighboring vehicle has been described in regard to FIG. 11, and the example where the electronic device 1000 of the emergency vehicle transmits the emergency request message to the traffic light has been described in regard to FIG. 12. According to various embodiments of the present disclosure, the electronic device 1000 of the emergency vehicle can detect that the electronic device 1000 approaches the location within the traffic light transmission range and transmit the emergency request message to the traffic light, while periodically or aperiodically transmitting the emergency notification message to another neighboring vehicle.

Figure 13:
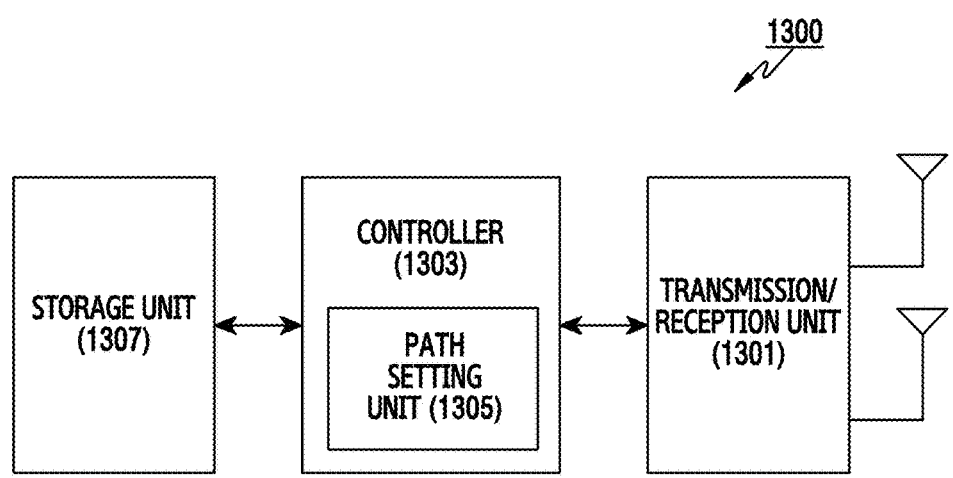
FIG. 13 is a block diagram illustrating an intelligent traffic system server according to an embodiment of the present disclosure.

FIG. 13 is a block diagram illustrating an intelligent traffic system server according to an embodiment of the present disclosure.

Referring to FIG. 13, an ITS server 1300 may include a transmission/reception unit 1301, a controller 1303, a storage unit 1307, and one or more antenna.

The transmission/reception unit 1301 can transmit/receive a signal to/from an electronic device of at least one other vehicle and a traffic light. In addition, the transmission/reception unit 1301 communicates with the HSS 305 according to a request of an electronic device of at least one vehicle.

The controller 1303 can control and process an overall operation of the ITS server 1300, and may include a path setting unit 1305 according to an embodiment of the present disclosure. The controller 1303 or the path setting unit 1305 can also set the path from the current location of the electronic device 1000 of the emergency vehicle to the destination thereof, and acquire the information on the traffic light located on the set path, and control a function of transmitting the information to the electronic device 1000 of the emergency vehicle. For example, the path setting unit 1305 can acquire the location information and the destination address information of the electronic device 1000 of the emergency vehicle from the path setting request message received from the electronic device 1000 of the emergency vehicle, and set the path from the current location to the destination in consideration of various kinds of traffic information. In addition, the path setting unit 1305 can identify a location and an ID of each of the traffic lights located on the set path. The location and the ID of each of the traffic lights can be identified from a database including locations and ID information of a plurality of traffic lights. Additionally, the path setting unit 1305 can control a function for transmitting a traffic light authentication request message to the HSS. For example, the path setting unit 1305 can transmit, to the HSS, the traffic light authentication request message including the ID information of each of the traffic lights located on the set path, and receive a traffic light authentication response message including a traffic light authentication key for each of the traffic lights in response thereto.

After receiving the traffic light authentication response message, the path setting unit 1305 can control a function of transmitting a path response message to the electronic device 601 of the emergency vehicle in response to the path setting request message. According to an embodiment of the present disclosure, the path setting unit 1305 can transmit, to the electronic device 1000 of the emergency vehicle, the path response message including the path information from the current location of the electronic device 1000 of the emergency vehicle to the destination thereof, the location of each of the traffic lights located on the corresponding path, the ID of each of the traffic lights located on the corresponding path, and/or the traffic light authentication key for each of the traffic lights located on the corresponding path.

The storage unit 1307 stores various programs and data for an overall operation of the ITS server. The storage unit 1307 can store a command or data which is received from or generated by the controller 1303 or other components. The storage unit 1307 according to an embodiment of the present disclosure can store various kinds of traffic information (e.g., road situation information, accident information, information on each road, etc.). Further, the storage unit 1307 may include a database including locations and ID information of a plurality of traffic lights.

Figure 14:
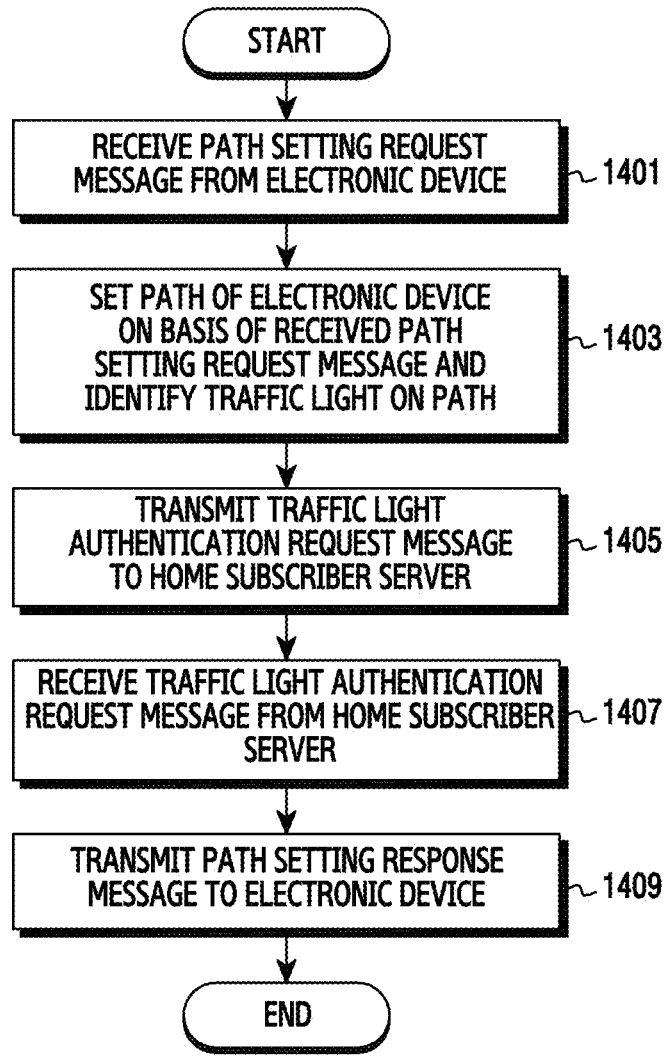
FIG. 14 is a flowchart illustrating a procedure of an intelligent traffic system server according to an embodiment of the present disclosure.

FIG. 14 is a flowchart illustrating a procedure of an intelligent traffic system server according to an embodiment of the present disclosure.

Referring to FIG. 14, the ITS server 1300 receives, from an electronic device, the path setting request message in operation 1401. For example, the ITS server 1300 can receive, from the electronic device 1000 of the emergency vehicle, the path setting request message including the current location and the destination address information of the corresponding electronic device 1000.

The ITS server 1300 can identify a path setting of the electronic device and a traffic light existing on the set path on the basis of the received path setting request message in operation 1403. For example, the ITS server 1300 can acquire the current location and the destination address information of the corresponding electronic device 1000 from the path setting request message received from the electronic device 1000 of the emergency vehicle, and set the path from the current location to the destination in consideration of various kinds of traffic information (e.g., road situation information, accident information, road speed information, etc.). In addition, the ITS server 1300 can acquire the location and the ID of each of the traffic lights located on the set path from the pre-stored database.

The ITS server 1300 can transmit a traffic light authentication request message to the HSS in operation 1405. For example, the ITS server 1300 can transmit, to the HSS, the traffic light authentication request message including ID information of each of the traffic lights located on the set path. The ITS server 1300 can receive the traffic light authentication request message from the HSS in operation 1407. For example, the ITS server 1300 can receive the traffic light authentication response message including the traffic light authentication key for each of the traffic lights located on the set path in response to the traffic light authentication request message.

Thereafter, the ITS server 1300 transmits the path setting response message to the electronic device in operation 1409. For example, the ITS server 1300 can transmit, to the electronic device 1000 of the emergency vehicle, the path response message including the path information from the current location of the electronic device 1000 of the emergency vehicle to the destination thereof, the location of each of the traffic lights located on the corresponding path, the ID of each of the traffic lights located on the corresponding path, and/or the traffic light authentication key for each of the traffic lights located on the corresponding path.

Thereafter, the ITS server 1300 can terminate the procedure according to the embodiment of the present disclosure.

Figure 15:
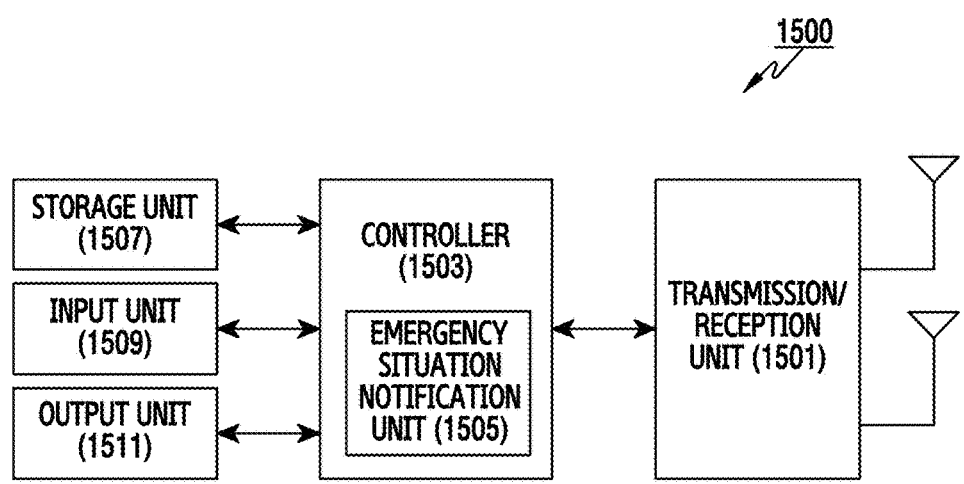
FIG. 15 is a block diagram illustrating an electronic device of another vehicle according to an embodiment of the present disclosure.

FIG. 15 is a block diagram illustrating an electronic device of another vehicle according to an embodiment of the present disclosure.

Referring to FIG. 15, an electronic device 1500 of another vehicle may include a transmission/reception unit 1501, a controller 1503, a storage unit 1507, an input unit 1509, an output unit 1511, and one or more antenna. According to an embodiment of the present disclosure, the electronic device 1500 of the another vehicle may be an electronic device which does not have regulatory and/or control rights of a traffic light and at least one other vehicle.

The transmission/reception unit 1501 can transmit/receive a signal to/from an electronic device of at least one other vehicle. For example, the transmission/reception unit 1501 can transmit/receive an emergency notification message to/from the electronic device of the at least one other vehicle on the basis of D2D communication.

The controller 1503 can control and process an overall operation of the electronic device 1500, and may include an emergency situation notification unit 1505 according to an embodiment of the present disclosure. The controller 1503 or the emergency situation notification unit 1505 can also perform a function of notifying a user that an emergency vehicle exists nearby when receiving the emergency notification message from an electronic device of a neighboring emergency vehicle. The emergency situation notification unit 1505 can determine whether the electronic device 1500 exists on a path of the emergency vehicle or whether an overlapping path part exists by comparing the expected path of the emergency vehicle with an expected path of the electronic device 1500, and can determine whether to notify a user of the vehicle that the emergency vehicle exists nearby according to a result of the determination. For example, the emergency situation notification unit 1505 can make a determination to notify a user that the emergency vehicle exists nearby when the electronic device 1500 exists on the path of the emergency vehicle or when a part of the path of the emergency vehicle and a part of the path of the electronic device 1500 overlap each other. As another example, the emergency situation notification unit 1505 can make a determination not to notify a user that the emergency vehicle exists nearby when the electronic device 1500 does not exist on the path of the emergency vehicle or when the path of the emergency vehicle and the path of the electronic device 1500 do not overlap each other.

When receiving the emergency notification message from the electronic device of the emergency vehicle, the emergency situation notification unit 1505 can make a determination to notify a user that the emergency vehicle exists nearby, and can direct the display of location information of the vehicle which has transmitted the emergency notification message or direct the output of an audio signal indicating that the emergency vehicle exists nearby. As another example, the emergency situation notification unit 1505 can control a function of displaying, on a screen, the path information of the emergency vehicle.

Additionally, the emergency situation notification unit 1505 can set a notification release timer on the basis of a speed of the emergency vehicle, a speed of the vehicle thereof, a location of the emergency vehicle, and a location of the vehicle thereof, operate the set notification release timer, and release a notification for the emergency vehicle when the notification release timer expires. For example, the emergency situation notification unit 1505 can continuously display location information and/or path information of the emergency vehicle until the notification release timer expires and remove the location information and/or the path information of the emergency vehicle when the notification release timer expires. As another example, the emergency situation notification unit 1505 can continuously output an audio signal indicating that the emergency vehicle exists nearby until the notification release timer expires and terminate the output of the audio signal indicating that the emergency vehicle exists nearby.

The storage unit 1507 stores various programs and data for an overall operation of the electronic device 1500. The storage unit 1507 can store a command or data which is received from or generated by the controller 1503 or other components. The storage unit 1507 may be a memory including programming modules such as a kernel, middleware, an API, an application, etc. According to an embodiment of the present disclosure, each of the programming modules may be implemented by software, firmware, hardware, or a combination of two or more thereof.

The input unit 1509 provides, to the controller 1503, data input from a user of the electronic device 1500. For example, the input unit 1509 may include a keypad including at least one key button, a touch pad or touch sensor for detecting a touch input of a user, a microphone for receiving input of voice of a user, a physical function key button mapped to a specific function, etc. The input unit 1509 according to an embodiment of the present disclosure can acquire, from a user, the information on the destination (e.g., destination address information, destination name information, etc.).

The output unit 1511 can display various pieces of information and graphical elements generated during an operation of the electronic device 1500 or output an audio signal. According to an embodiment of the present disclosure, the output unit 1511 can include a display for displaying the command or data received from the controller 1503 or the other components. For example, the output unit 1511 can display a screen on which an input of the destination of the electronic device 1500 is required and display a map indicating the path from the current location of the electronic device 1500 to the destination thereof. Further, the output unit 1511 can display a map indicating a location of the emergency vehicle. In addition, the output unit 1511 can include an audio output unit for outputting, as an audio signal, the command or data received from the controller 1503 or the other components. For example, the output unit 1511 can output an audio signal indicating that an emergency vehicle exists nearby.

Figure 16:
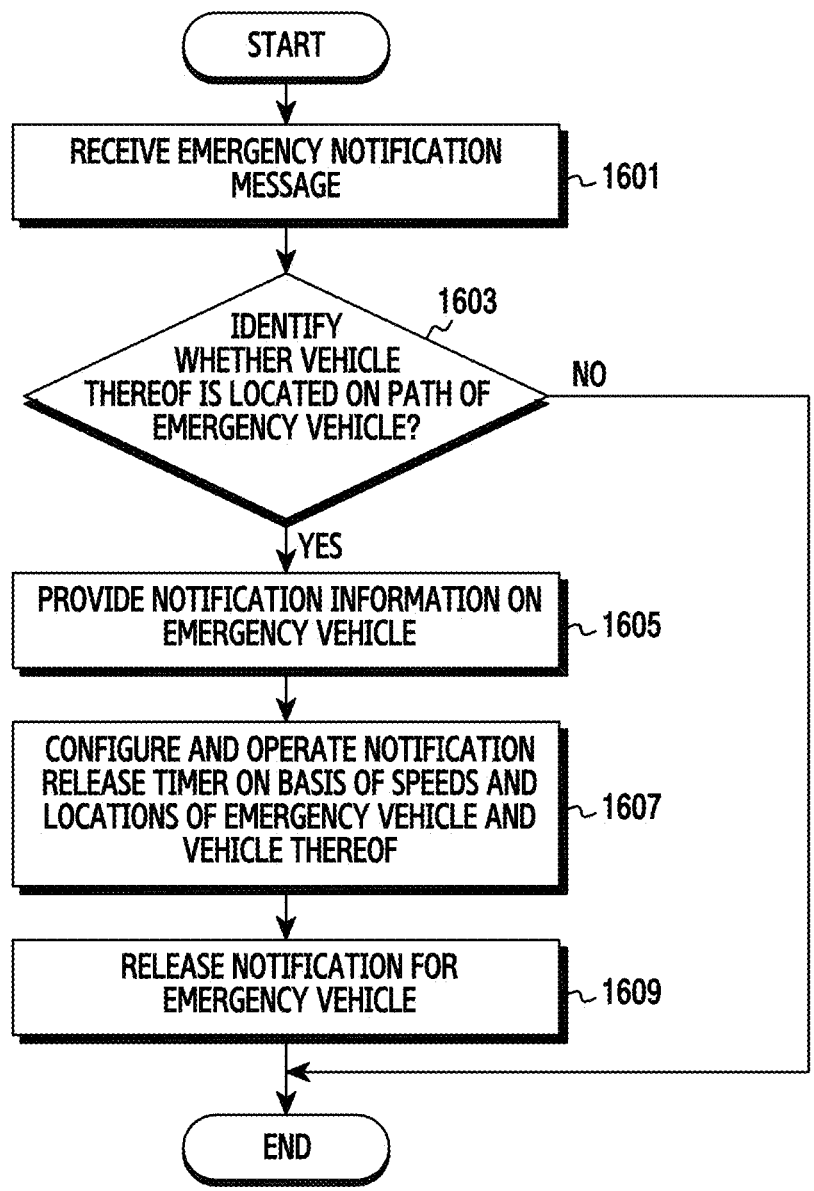
FIG. 16 is a flowchart illustrating a procedure of an electronic device of another vehicle according to an embodiment of the present disclosure.

FIG. 16 is a flowchart illustrating a procedure of an electronic device of another vehicle according to an embodiment of the present disclosure.

Referring to FIG. 16, the electronic device 1500 of the another vehicle receives an emergency notification message in operation 1601. For example, the electronic device 1500 of the another vehicle can receive the emergency notification message from the electronic device 1000 of the emergency vehicle located nearby. At this time, the emergency notification message may include speed information, location information, and path information of the electronic device 1000 of the emergency vehicle.

The electronic device 1500 of the another vehicle can identify whether the another vehicle exists on the path of the emergency vehicle in operation 1603. For example, the electronic device 1500 of the another vehicle can determine whether the another vehicle exists on the path of the emergency vehicle, on the basis of the path information of the electronic device 1000 of the emergency vehicle and the current location information of the electronic device 1500 of the another vehicle. As another example, the electronic device 1500 of the another vehicle can predict whether the another vehicle exists on the path of the emergency vehicle, on the basis of the path information of the electronic device 1000 of the emergency vehicle and the path information to the destination of the electronic device 1500 of the another vehicle.

When it is identified that the another vehicle does not exist on the path of the emergency vehicle, the electronic device 1500 of the another vehicle can discard the received emergency notification message and terminate the procedure according to the embodiment of the present disclosure. For example, the electronic device 1500 of the another vehicle does not provide information related to the emergency vehicle to a user when the current location of the another vehicle does not overlap the path of the emergency vehicle or when the path of the emergency vehicle and the path of the another vehicle do not overlap each other.

When it is identified that the another vehicle is located on the path of the emergency vehicle, the electronic device 1500 of the another vehicle can provide notification information for the emergency vehicle in operation 1605. For example, the electronic device 1500 of the another vehicle can display, on a screen, notification information for the emergency vehicle or output an audio signal indicating that the emergency vehicle exists nearby when the current location thereof is included in the path of the emergency vehicle or when a part of the path of the another vehicle and a part of a path of yet another vehicle overlap each other.

The electronic device 1500 of the another vehicle can set the notification release timer on the basis of speeds and/or locations of the emergency vehicle and the another vehicle, and operate the set notification release timer in operation 1607, and release the notification for the emergency vehicle when the notification release timer expires in operation 1609. For example, the electronic device 1500 of the another vehicle can display, on a screen, the notification information for the emergency vehicle until the notification release timer expires and remove the notification information for the emergency vehicle from the screen when the notification release timer expires. As another example, the electronic device 1500 of the another vehicle can continuously output an audio signal indicating that the emergency vehicle exists nearby until the notification release timer expires, and terminate the output of the audio signal when the notification release timer expires. In the above description, although the notification information for the emergency vehicle is provided in operation 1605 and the notification release timer is set and operated in operation 1607, operation 1605 and operation 1607 may be performed simultaneously or may be performed inversely.

Thereafter, the electronic device 1500 can terminate the embodiment of the present disclosure.

Figure 17:
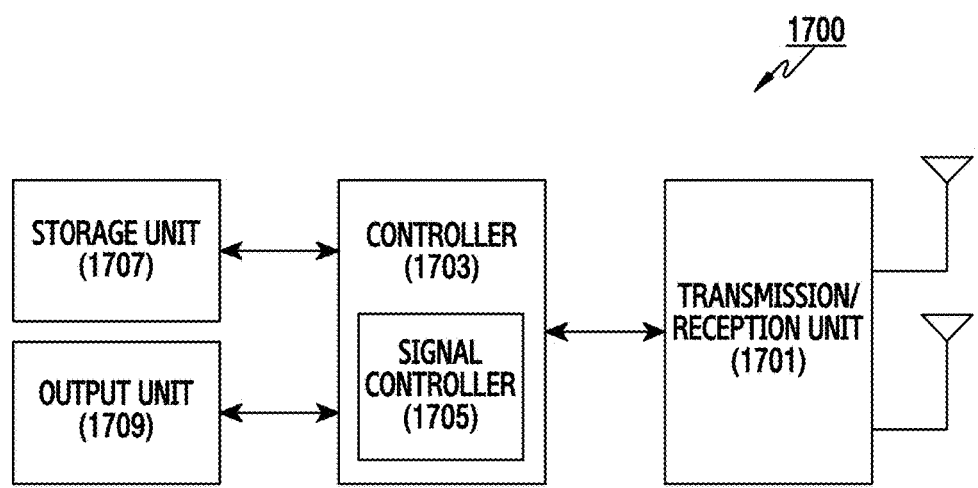
FIG. 17 is a block diagram illustrating a traffic light according to an embodiment of the present disclosure.

FIG. 17 is a block diagram illustrating a traffic light according to an embodiment of the present disclosure.

Referring to FIG. 17, a traffic light 1700 may include a transmission/reception unit 1701, a controller 1703, a storage unit 1707, an output unit 1709, and one or more antenna.

The transmission/reception unit 1701 can transmit/receive a signal to/from an electronic device of at least one vehicle. For example, the transmission/reception unit 1701 can transmit/receive an emergency request message to/from the electronic device of the at least one emergency vehicle on the basis of D2D communication. Additionally, the transmission/reception unit 1701 can transmit/receive a signal to/from at least one adjacent traffic light and/or a traffic light controller.

The controller 1703 controls and processes an overall operation of the traffic light 1700, and includes a signal controller 1705 according to embodiments of the present disclosure. The controller 1703 or the signal controller 1705 also receives the emergency request message from the electronic device 1000 of the emergency vehicle, and performs a function of controlling a display (e.g., a stop display, a progress display, a caution display, etc.) of the traffic light. For example, the signal controller 1705 can display a green color indicating the progress display when receiving the emergency request message from the electronic device 1000 of the emergency vehicle. Additionally, the signal controller 1705 can acquire a traffic light ID from the received emergency request message, and identify whether the acquired traffic light ID and an ID of the traffic light 1700 are identical to each other through comparison. When the acquired traffic light ID and the ID of the traffic light 1700 are not identical to each other, the signal controller 1705 can identify that the received emergency request message is not a signal targeted to the traffic light 1700, and ignore the received emergency request message. When the acquired traffic light ID and the ID of the traffic light 1700 are identical to each other, the signal controller 1705 can identify that the received emergency request message is a signal targeted to the traffic light 1700, and acquire the speed information and/or the location information of the emergency vehicle from the received emergency request message. The signal controller 1705 can determine a control time on the basis of the received speed information and/or the location information and forcibly control displaying of the traffic light 1700 during the determined control time. For example, the signal controller 1705 does not control a signal display according a scheme predetermined in the traffic light 1700 in order to perform to a smooth traffic situation control, but displays a green light indicting the progress display during the determined control time. This is for enabling the emergency vehicle to move to the destination during the determined control time without waiting for a signal. The signal controller 1705 can release a forcible signal control when a determined control time is elapsed. Additionally, the signal controller 1705 can notify another adjacent traffic light that the emergency vehicle is detected, and perform a function for requesting control of displaying of the traffic light.

The controller 1703 can perform authentication for the electronic device 1000 in order to determine whether the electronic device 1000 of the emergency vehicle is an electronic device having a regulatory and/or control right for the traffic light 1700 when receiving, from the electronic device 1000 of the emergency vehicle, the emergency request message including service information requesting a signal display control, an input random number, and a transmission-side authentication token $AUTN_{TX}$. For example, the controller 1703 can generate a response RES necessary for mutual authentication and a reception-side authentication token $AUTN_{RX}$ using the cryptographic function having, as inputs, the authentication key $K_{ps}$ previously received from the HSS, the random number received from the electronic device 1000 of the emergency vehicle, and a sequence number included in the transmission-side authentication token received from the electronic device 1000 of the emergency vehicle. The controller 1703 can authenticate the electronic device 1000 of the emergency vehicle by identifying whether the generated reception-side authentication token $AUTN_{RX}$ and the transmission-side authentication token $AUTN_{TX}$ received from the electronic device 1000 of the emergency vehicle coincide with each other. When the reception-side authentication token $AUTN_{RX}$ and the transmission-side authentication token $AUTN_{TX}$ are identical to each other, the traffic light 1700 can authenticate that the electronic device 1000 is an electronic device having a regulatory and/or control right for the traffic light 1700. The controller 1703 can transmit an emergency response message to the electronic device 1000 of the emergency vehicle in response to the emergency request message.

The storage unit 1707 stores various programs and data for an overall operation of the electronic device 1700. The storage unit 1707 can store a command or data which is received from or generated by the controller 1703 or other components. The storage unit 1707 may be a memory including programming modules such as a kernel, middleware, an API, an application, etc. Each of the programming modules may be implemented by software, firmware, hardware, or a combination of two or more thereof. The storage unit 1707 can store the previously-received authentication key $K_{ps}$.

The output unit 1709 can output a light for displaying the traffic light 1700. According to an embodiment of the present disclosure, the output unit 1709 can control the output of the light for controlling display (e.g., a stop display, a progress display, a caution display, etc.) of the traffic light 1700 by the controller 1703. For example, the output unit 1709 may output a red light for the stop display, output a green light for the progress display, and output a yellow light for the caution display by the controller 1703.

Figure 18:
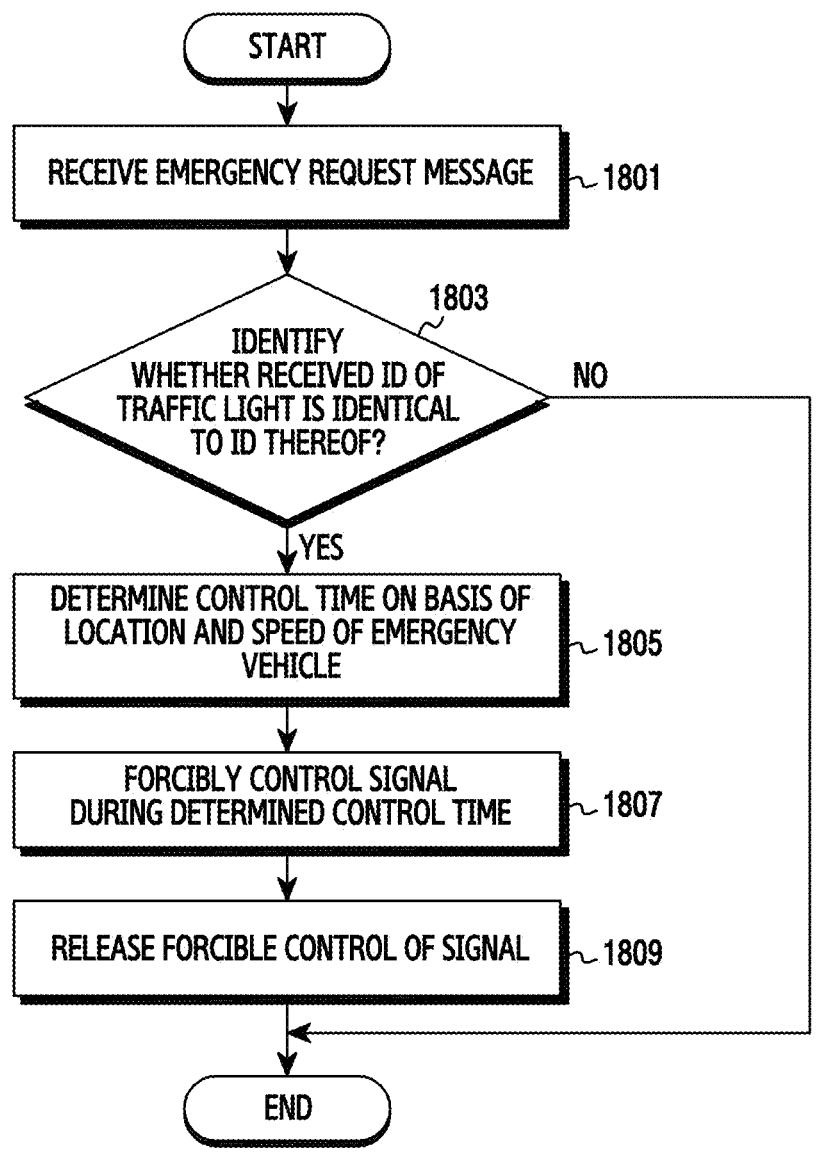
FIG. 18 is a flowchart illustrating a procedure of a traffic light control according to an embodiment of the present disclosure.

FIG. 18 is a flowchart illustrating a procedure of a traffic light control according to an embodiment of the present disclosure.

Referring to FIG. 18, the traffic light 1700 can receive the emergency request message in operation 1801, and can acquire a traffic light ID from the received emergency request message and identify whether the acquired traffic light ID and the ID of the traffic light 1700 are identical to each other through comparison in operation 1803.

When the acquired traffic light ID and the ID of the traffic light 1700 are not identical to each other, the traffic light 1700 can identify that the received emergency request message is not a signal targeted to the traffic light 1700, ignore the received emergency request message, and terminate the procedure according to embodiments of the present disclosure.

When the acquired traffic light ID and the ID of the traffic light 1700 are identical to each other, the traffic light 1700 can identify that the received emergency request message is a signal targeted to the traffic light 1700, and determine a control time on the basis of the location and/or speed of the emergency vehicle in operation 1805. For example, the traffic light 1700 can acquire the speed information and the location information of the emergency vehicle from the received emergency request message and determine a control time on the basis of the acquired speed information and the location information.

Thereafter, the traffic light 1700 can forcibly control a display of the traffic light 1700 during the determined control time in operation 1807, and release the forcible signal control when the determined control time is elapsed in operation 1809. For example, the traffic light 1700 does not control a signal display according to a scheme predetermined in the traffic light 1700 during the determined control time, but can display a green light indicating the progress display in order to drive the emergency vehicle in response to the emergency request message, and control the signal display according to the predetermined scheme when the determined control time is elapsed.

Figure 19:
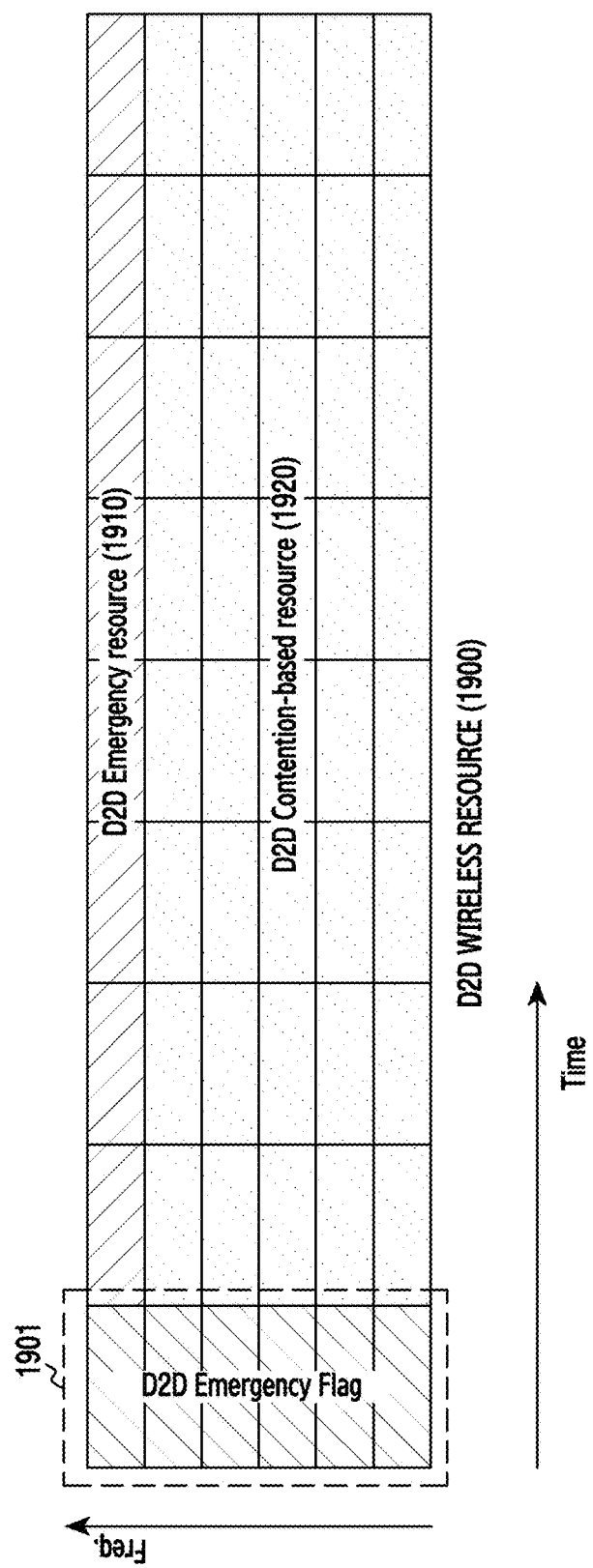
FIG. 19 illustrates a configuration of a D2D wireless resource according to an embodiment of the present disclosure.

FIG. 19 illustrates a configuration of a D2D wireless resource according to an embodiment of the present disclosure.

Referring to FIG. 19, when allocating a wireless resource for D2D communication, an evolved NodeB (eNB) according to an embodiment of the present disclosure can classify a D2D resource 1900 into a resource (e.g., a D2D emergency resource 1910) for an emergency service and a resource (e.g., a D2D contention-based resource 1920) competitively used by D2D user equipment (UEs) using a service other than the emergency service. In particular, the eNB can allocate the resource for the emergency service more preferentially than a resource for other non-emergency services. For example, the eNB can define a priority for each service, allocate a resource to each service on the basis of the defined priority, and at this time, allocate the highest priority to a service of the emergency vehicle.

When a D2D emergency flag is configured in a first symbol 1901 of the D2D wireless resource 1900, the eNB according to an embodiment of the present disclosure can allow electronic devices using the emergency service to use the resource 1910 for the emergency service and allow all electronic devices performing the D2D communication to use the D2D contention-based resource 1920.

Meanwhile, when the D2D emergency flag is not configured in a first symbol 1901 of the D2D wireless resource 1900, the eNB according to an embodiment of the present disclosure can allow all electronic devices using the emergency service to use the resource 1910 for the emergency service and the D2D contention-based resource 1920.

Figure 20:
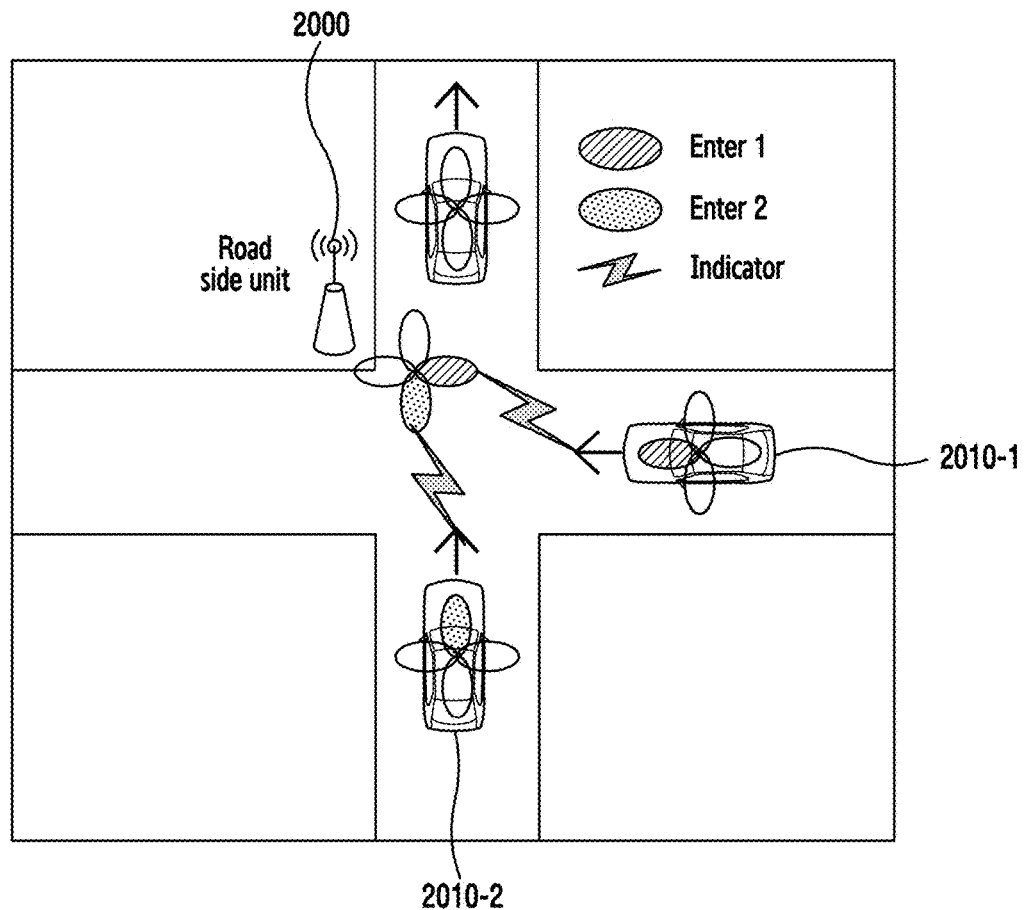
FIG. 20 illustrates an example of providing vehicle driving-related information on the basis of a transmission/reception beam pair of a road side unit (RSU) and an on-board unit (OBU) by a millimeter wave beamforming support system according to another embodiment of the present disclosure.

FIG. 20 illustrates an example of providing vehicle driving-related information on the basis of a transmission/reception beam pair of an RSU and an OBU in a millimeter wave beamforming support system according to an embodiment of the present disclosure.

Hereinafter, the OBU may be referred to as a vehicle electronic device or an electronic device.

Referring to FIG. 20, in a system supporting millimeter wave beamforming according to an embodiment of the present disclosure, an RSU 2000 can provide driving-related information of another vehicle to a specific vehicle electronic device on a road (e.g., an alley, an intersection, etc.) where it is difficult to ensure a visual field of a driver, on the basis of a result of signal transmission/reception using beamforming with electronic devices of vehicles 2010-1 and 2010-2. For example, the RLU 2000 can provide information indicating that the second vehicle 2010-2 is entering an intersection, to the electronic device of the first vehicle 2010-1 which is also entering the intersection. As another example, the RLU 2000 can provide information indicating that the first vehicle 2010-1 is entering an intersection, to the electronic device of the second vehicle 2010-2 which is also entering the intersection. In an embodiment of the present disclosure, the RLU 2000 can reduce a probability that a vehicle collision accident occurs in an alley where it is difficult to ensure a visual field, by providing driving-related information on another vehicle to a specific vehicle electronic device.

Figure 21:
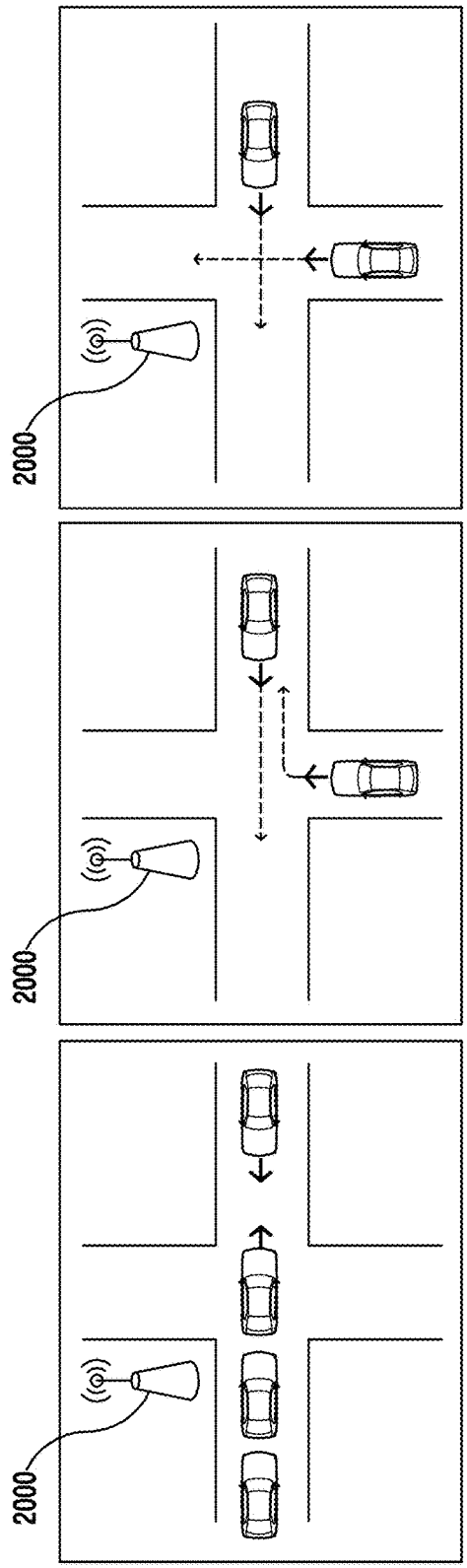
FIGS. 21A to 21C illustrate examples of situations in which it is necessary to provide vehicle driving-related information according to another embodiment of the present disclosure.

FIGS. 21A to 21C illustrate examples of situations in which it is necessary to provide vehicle driving-related information according to another embodiment of the present disclosure.

Referring to FIGS. 21A to 21C, collisions may occur when vehicles are driving through an intersection, turning in an intersection, or passing in an intersection, where it is difficult in each case to ensure a visual field of drivers. According to an embodiment of the present disclosure, the RLU 2000 capable of transmitting/receiving a beamforming-based signal can detect such a situation and provide the detected driving-related information of the vehicle to another vehicle electronic device.

In addition, in an embodiment of the present disclosure, since the provision of information on all vehicles which are driving on the corresponding road to a specific vehicle electronic device by the RLU 2000 may increase confusion with respect to the vehicle driver, only vehicles having a collision probability can be selected, and information on a possible collision counterpart vehicle can be provided to electronic devices of the selected vehicles.

Figure 22:
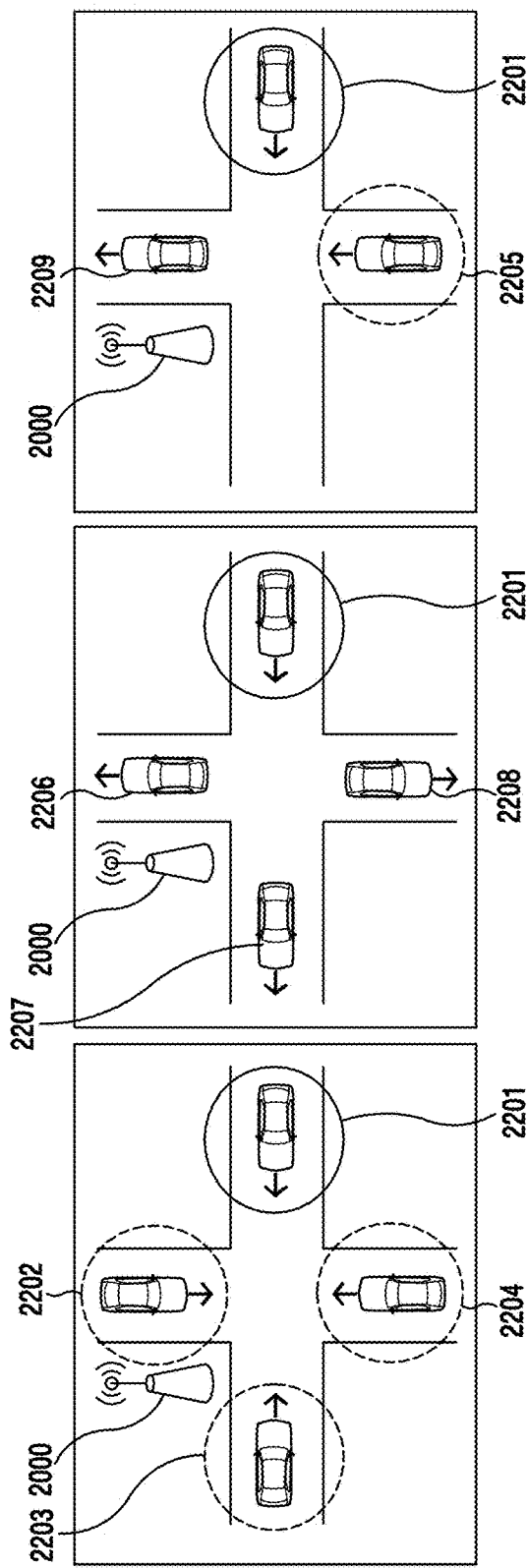
FIGS. 22A to 22C illustrate examples of other vehicles which require provision of vehicle driving-related information when a specific vehicle enters an intersection according to another embodiment of the present disclosure.

FIGS. 22A to 22C illustrates examples of other vehicles which require provision of vehicle driving-related information when a specific vehicle enters an intersection according to another embodiment of the present disclosure.

Referring to FIGS. 22A to 22C, when it is detected that a first vehicle 2201 enters an intersection, the RLU 2000 can provide information indicating that the first vehicle 2201 is entering the corresponding intersection to other vehicles 2202, 2203, 2204, and 2205 which are predicted to enter the corresponding intersection while the first vehicle 2201 enters the corresponding intersection. As another example, the RLU 2000 does not provide the information indicating that the first vehicle 2201 is entering the corresponding intersection to other vehicles 2206, 2207, 2208, and 2209 which are predicted to exit from the corresponding intersection while the first vehicle 2201 enters the corresponding intersection.

According to an embodiment of the present disclosure, the RLU 2000 can determine whether each vehicle is entering the intersection or exiting from the intersection according to the transmission/reception beam pair determined on the basis of a result of signal transmission/reception using the beamforming with the electronic devices of the vehicles.

Figure 23:
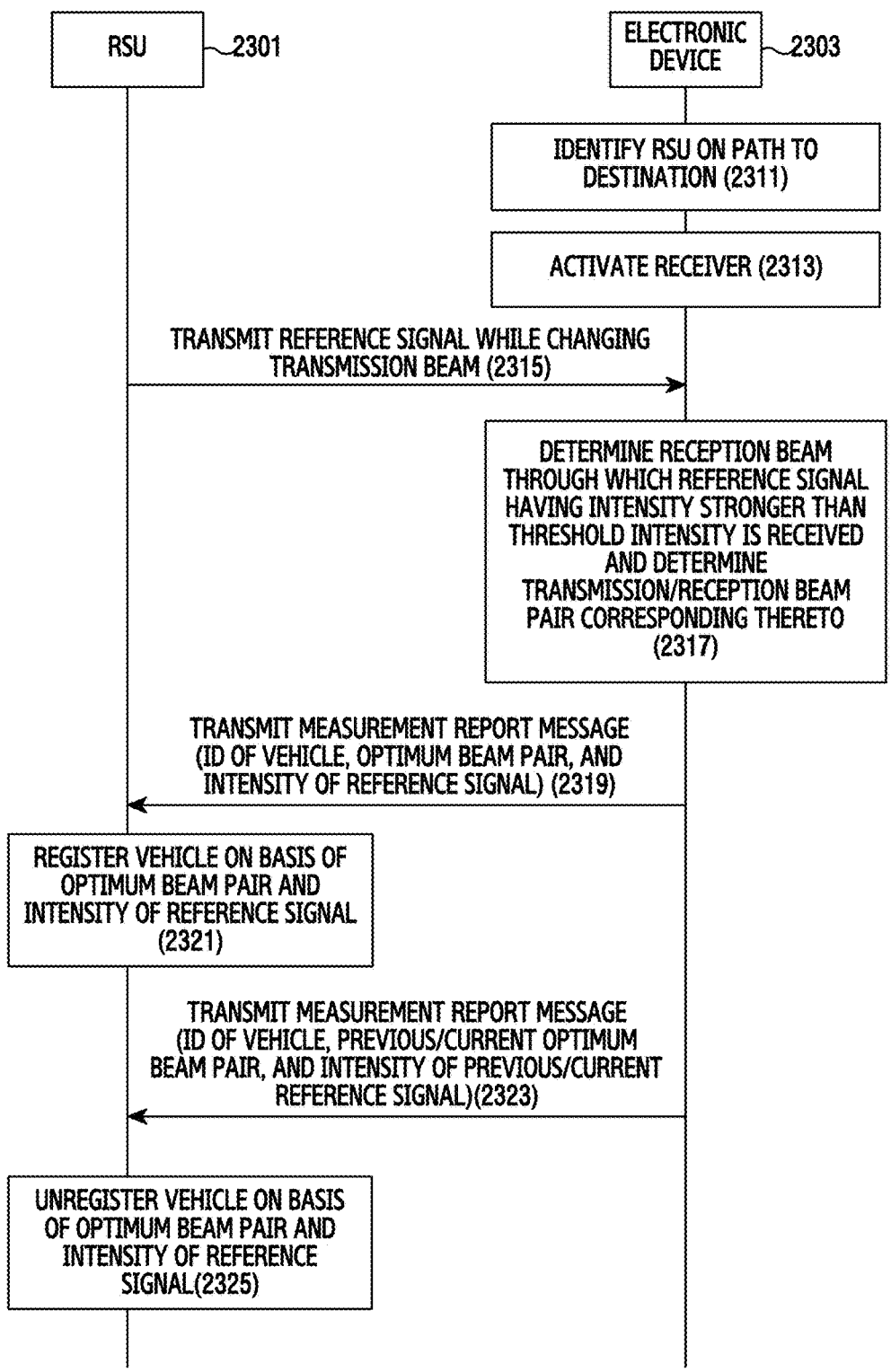
FIG. 23 is a signal flow diagram illustrating a procedure of registering/unregistering a vehicle in/from an RSU according to another embodiment of the present disclosure.

FIG. 23 is a signal flow diagram illustrating a procedure of registering/unregistering a vehicle in/from an RSU according to an embodiment of the present disclosure.

Hereafter, an electronic device 2303 may refer to an OBU but embodiments are not limited thereto.

Referring to FIG. 23, the electronic device 2303 can determine whether an RSU exists on a path to a destination in operation 2311. For example, the electronic device 2303 can determine whether the RSU exists on the path to the destination of the electronic device 2303, using a navigation function provided therein or a navigation service provided by another apparatus interworking with the electronic device 2303.

The electronic device 2303 can activate a receiver in operation 2313. For example, the electronic device 2303 can activate an operation of the receiver supporting millimeter wave beamforming. When the receiver is activated, the electronic device 2303 can attempt to receive a reference signal from an RSU 2301 while changing a reception beam of the receiver.

In order to determine a transmission/reception beam pair optimal to the electronic device 2303, the RSU 2301 can transmit the reference signal while changing a transmission beam in operation 2315. According to an embodiment of the present disclosure, the RSU 2301 can transmit the reference signal while the reference signal includes a beam index of the corresponding transmission beam. Although not illustrated in the drawing, the RSU 2301 can periodically or aperiodically perform the operation of transmitting the reference signal while changing the transmission beam. According to an embodiment of the present disclosure, the RSU 2301 may transmit the reference signal in all transmission beam directions which can be formed by a transmitter or may transmit the reference signal using a plurality of predetermined transmission beam directions.

The electronic device 2303 determines a reception beam through which a reference signal having an intensity stronger than a threshold intensity is received, and determines a beam pair corresponding thereto in operation 2317. For example, the electronic device 2303 can determine the reception beam through which the reference signal having an intensity stronger than the threshold intensity is received on the basis of a result of attempting to receive the reference signal while changing the reception beam, and determine a beam pair set by a transmission beam index and a reception beam index, by distinguishing the transmission beam index of the RSU from the reference signal received through the determined reception beam. According to an embodiment of the present disclosure, the electronic device 2303 may attempt to receive the reference signal in all reception beams which can be formed by the receiver or may attempt to receive the reference signal using the plurality of predetermined reception beam directions.

The electronic device 2303 transmits a measurement report message indicating a result of measuring the reference signal in operation 2319. The measurement report message may include an ID of a vehicle, the determined beam pair, and reception intensity information of the reference signal of the electronic device 2303.

When the measurement report message is received from an unregistered vehicle, the RSU 2301 registers a vehicle on the basis of the optimum beam pair and the intensity of the reference signal, which are included in the measurement report message, in operation 2321. For example, when the ID of the vehicle included in the measurement report message is not registered in the RSU 2301, the RSU 2301 can detect that the electronic device 2303 is entering the corresponding road, and can register the corresponding ID of the vehicle, the optimum beam pair, and the intensity of the reference signal, in a vehicle database of the RSU 2301.

When the RSU 2301 exists within a predetermined range with respect to a location of the electronic device 2303 on the path to the destination, the electronic device 2303 can determine the reception beam through which the reference signal having an intensity stronger than the threshold intensity is received, while periodically or aperiodically changing the reception beam of the receiver, and determine a beam pair corresponding thereto. Further, the electronic device 2303 transmits a measurement report message indicating a result of periodically or aperiodically measuring the reference signal, in operation 2323. At this time, the measurement report message may include the ID of the vehicle of the electronic device 2303, a previously-determined beam pair and a currently-determined beam pair, a reception intensity of a previous reference signal, and/or a reception intensity of a current reference signal.

When the measurement report message is received from the registered vehicle, the RSU 2301 can unregister the vehicle on the basis of the optimum beam pair and the intensity of the reference signal in operation 2325. For example, when the ID of the vehicle included in the measurement report message is registered in the RSU 2301, the RSU 2301 can detect that the electronic device 2303 deviates from the corresponding road on the basis of the previously-determined beam pair, the currently-determined beam pair, the reception intensity of the previous reference signal, and the reception intensity of the current reference signal, which are included in the measurement report message, and delete the corresponding vehicle from the vehicle database of the RSU 2301. As another example, the RSU 2301 can detect whether the electronic device 2303 deviates from the corresponding road, by comparing the optimum beam pair and the intensity of the reference signal, included in the measurement report message, with an optimum beam pair and an intensity of a reference signal, previously registered in the vehicle database of the RSU 2301 with regard to the corresponding ID of the vehicle.

Figure 24:
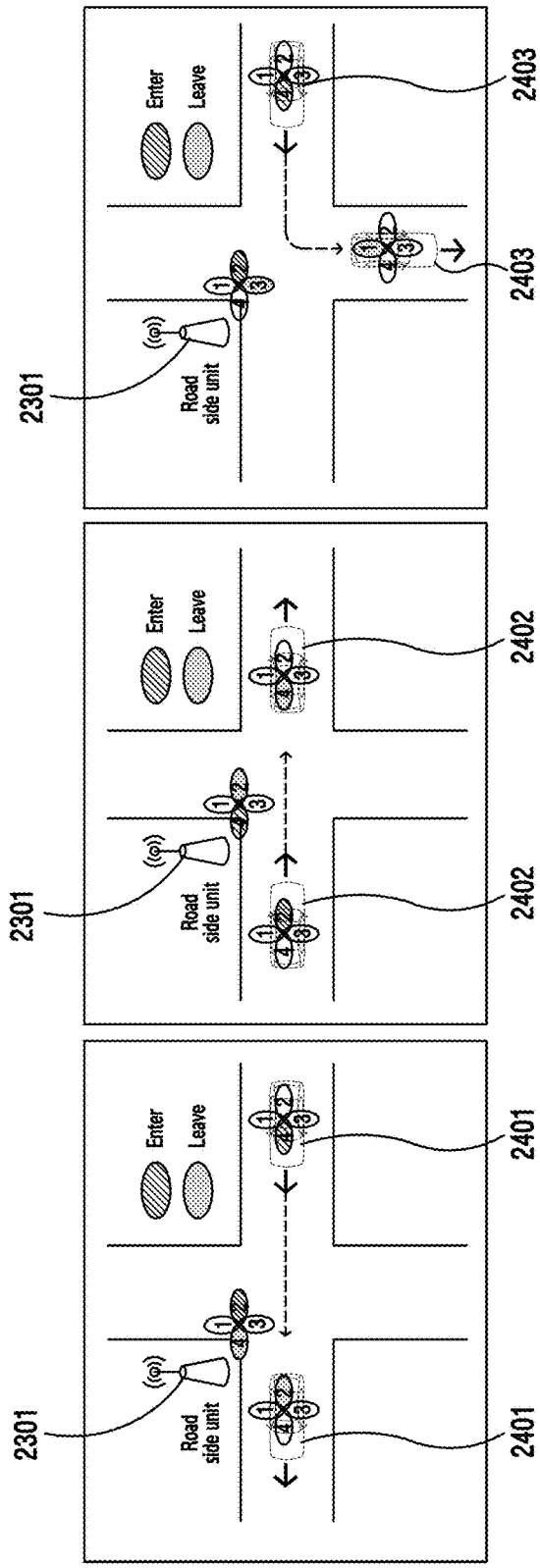
FIGS. 24A to 24C illustrate examples of determining entry of a vehicle on the basis of an optimum beam pair by an RSU according to another embodiment of the present disclosure.

FIGS. 24A to 24C illustrate examples of determining an entry of a vehicle on the basis of an optimum beam pair by an RSU according to an embodiment of the present disclosure.

Referring to FIG. 24A, when a first vehicle 2401 comes from a 3 o'clock direction and travels toward the 9 o'clock direction, an electronic device of the first vehicle 2401 can determine a transmission beam 2 and a reception beam 4 as an optimum beam pair when entering an intersection from the 3 o'clock direction. According to an embodiment of the present disclosure, the electronic device of the first vehicle 2401 can detect a reference signal having the largest reception intensity when the transmission beam 2 and the reception beam 4 are used, on the basis of a result of receiving reference signals, having been transmitted through transmission beams 1 to 4, through reception beams 1 to 4, and determine the transmission beam 2 and the reception beam 4 as an optimum beam pair. When the electronic device of the first vehicle 2401 reports that the optimum beam pair is the transmission beam 2 and the reception beam 4, the RSU 2301 can register information of the first vehicle 2401 as an intersection-entering vehicle.

Thereafter, the electronic device of the first vehicle 2401 can move to the 9 o'clock direction and determine the transmission beam 4 and the reception beam 2 as an optimum beam pair. When the electronic device of the first vehicle 2401 reports that the optimum beam pair is the transmission beam 4 and the reception beam 2, since the optimum beam pair of the first vehicle 2401 is changed, the RSU 2301 can detect that the first vehicle 2401 is exiting from the intersection in the 9 o'clock direction. Accordingly, the RSU 2301 can delete information of the first vehicle 2401.

Referring to FIG. 24B, when a second vehicle 2402 comes from the 9 o'clock direction and travels toward the 3 o'clock direction, an electronic device of the second vehicle 2402 can determine a transmission beam 4 and a reception beam 2 as an optimum beam pair when entering an intersection from the 9 o'clock direction. For example, the electronic device of the second vehicle 2402 can detect a reference signal having the largest reception intensity when the transmission beam 4 and the reception beam 2 is used, on the basis of a result of receiving reference signals, having been transmitted through transmission beams 1 to 4, through reception beams 1 to 4, and determine the transmission beam 4 and the reception beam 2 as an optimum beam pair. When the electronic device of the second vehicle 2402 reports that the optimum beam pair is the transmission beam 4 and the reception beam 2, the RSU 2301 can register information of the second vehicle 2402 as an intersection entering vehicle.

Thereafter, the electronic device of the second vehicle 2402 can move to the 3 o'clock direction and determine the transmission beam 2 and the reception beam 4 as an optimum beam pair. When the electronic device of the second vehicle 2402 reports that the optimum beam pair is the transmission beam 2 and the reception beam 4, since the optimum beam pair of the second vehicle 2402 is changed, the RSU 2301 can detect that the second vehicle 2402 is exiting from the intersection in the 3 o'clock direction. Accordingly, the RSU 2301 can delete information of the second vehicle 2402.

Referring to FIG. 24C, when a third vehicle 2403 comes from the 3 o'clock direction and travels toward the 6 o'clock direction, an electronic device of the third vehicle 2403 can determine a transmission beam 2 and a reception beam 4 as an optimum beam pair when entering an intersection from the 3 o'clock direction. When the electronic device of the third vehicle 2403 reports that the optimum beam pair is the transmission beam 2 and the reception beam 4, the RSU 2301 can register information of the third vehicle 2403 as an intersection entering vehicle.

Thereafter, the electronic device of the third vehicle 2403 can move to the 6 o'clock direction and determine the transmission beam 3 and the reception beam 1 as an optimum beam pair. When the electronic device of the third vehicle 2403 reports that the optimum beam pair is a transmission beam 3 and a reception beam 1, since the optimum beam pair of the third vehicle 2403 is changed, the RSU 2301 can detect that the third vehicle 2403 is exiting from the intersection in the 6 o'clock direction. Accordingly, the RSU 2301 can delete information of the third vehicle 2403.

Figure 25:
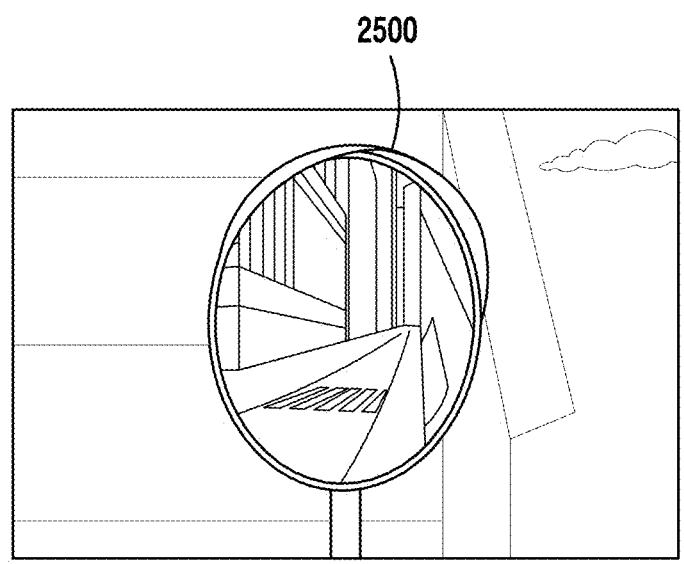
FIG. 25 illustrates an example of a location where an RSU can be arranged according to another embodiment of the present disclosure.

FIG. 25 illustrates an example of a location where an RSU can be arranged according to an embodiment of the present disclosure.

Referring to FIG. 25, the RSU according to an embodiment of the present disclosure may be provided on a road where it is difficult to ensure a visual field of a driver. For example, as illustrated, the RSU may be provided at any location where a convex mirror 2500 is provided or at a location where it is necessary for a convex mirror to be provided, in order to ensure the visual field of the driver. Other locations can include curved sections or intersections of roads, hilly sections or intersections of roads, locations where emergency or other vehicles frequently enter or exit roads, and so forth. However, the location of the RSU according to an embodiment of the present disclosure is not limited thereto.

Figure 26:
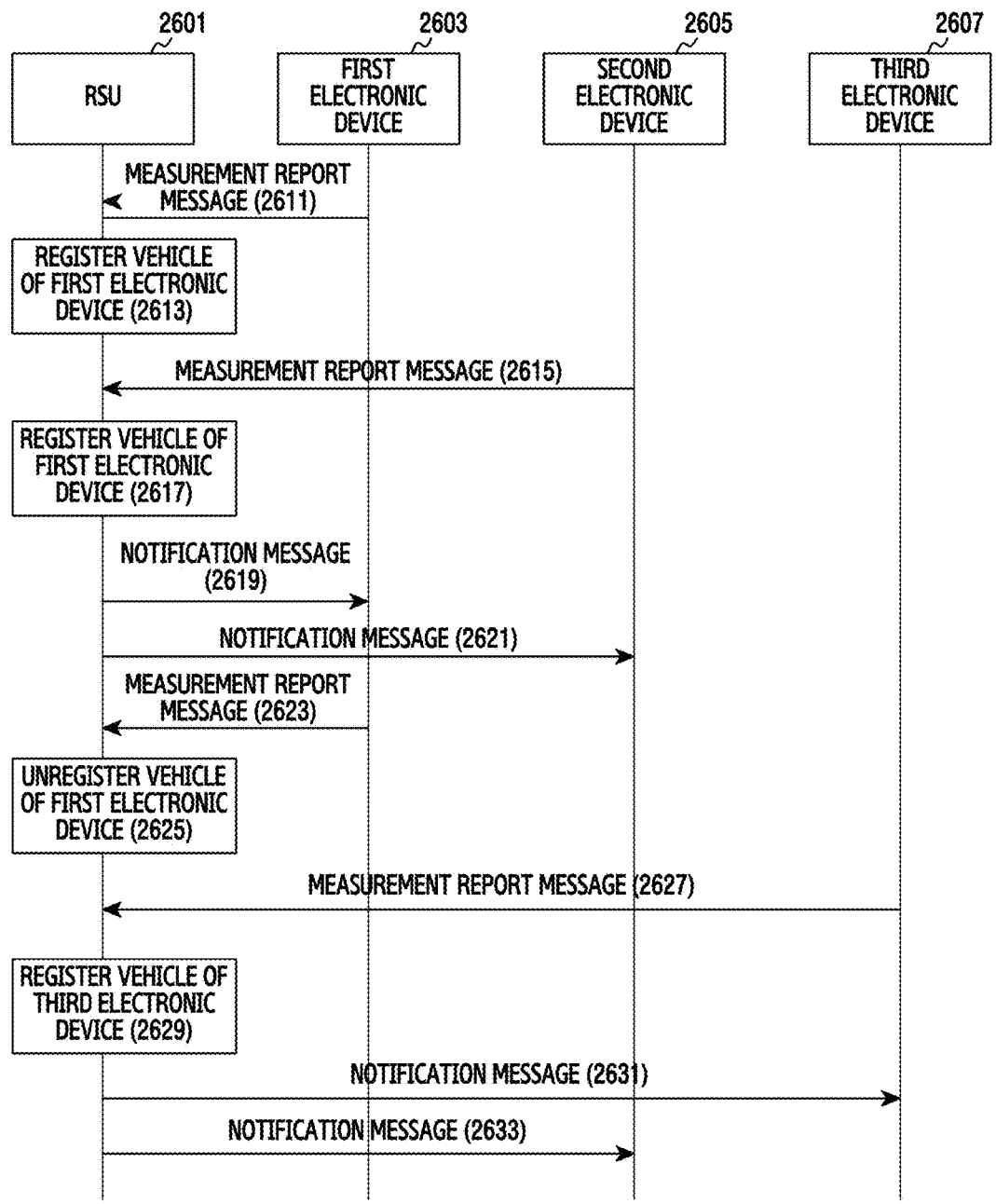
FIG. 26 is a signal flow chart illustrating a procedure of providing driving-related information of another vehicle to at least one registered vehicle when two or more vehicles are registered in an RSU according to another embodiment of the present disclosure.

FIG. 26 is a signal flowchart illustrating a procedure of providing driving-related information of another vehicle to at least one registered vehicle when two or more vehicles are registered in an RSU according to an embodiment of the present disclosure.

A description will be made based on an assumption that vehicles moving from different directions enter an intersection where an RSU 2601 exists. The description will be made in the case where the electronic devices mounted to the vehicles are moving from different directions and are referred to as a first electronic device 2603, a second electronic device 2605, and a third electronic device 2607.

Referring to FIG. 26, the first electronic device 2603 can transmit, to the RSU 2601, a measurement report message including an ID of a vehicle, an optimum beam pair, and a reference signal reception intensity in operation 2611. The RSU 2601 can register a vehicle of the first electronic device 2603 in operation 2613. For example, the RSU 2601 can register, in a vehicle database, the ID of the vehicle, the optimal beam pair, and/or the intensity of the reference signal of the first electronic device 2603.

The second electronic device 2605 can transmit, to the RSU 2601, a measurement report message including an ID of a vehicle, an optimum beam pair, and the reception signal of a reference signal in operation 2615. The RSU 2601 can register a vehicle of the second electronic device 2605 in operation 2617. For example, the RSU 2601 can register, in a vehicle database, the ID of the vehicle, the optimal beam pair, and/or the intensity of the reference signal of the second electronic device 2605.

The RSU 2601 can detect that there are a plurality of registered vehicles, and identify whether there are vehicles, from among a plurality of vehicles, entering an intersection from different directions, on the basis of an optimum beam pair of each of the plurality of vehicles. In an embodiment of the present disclosure, the RSU 2601 can detect when the vehicle of the first electronic device 2603 and the vehicle of the second electronic device 2605 enter an intersection from different directions. When it is detected that the vehicle of the first electronic device 2603 and the vehicle of the second electronic device 2605 are entering the intersection from different directions, the RSU 2601 can transmit a notification message to the first electronic device 2603 and the second electronic device 2605 in operation 2619 and in operation 2621, respectively.

Thereafter, the first electronic device 2603 can transmit, to the RSU 2601, another measurement report message including an ID of a vehicle, an optimum beam pair, and a reference signal reception intensity in operation 2623. At this time, the optimum beam pair may be different from the optimum beam pair included in the measurement report message of operation 2611. In this case, the RSU 2601 can unregister the vehicle of the first electronic device 2603 in operation 2625. For example, when the optimum beam pair included in the measurement report message of the first electronic device 2603 is different from the optimum beam pair registered in the vehicle database, the RSU 2601 can detect that the first electronic device 2603 exits from the corresponding intersection, and delete, from the vehicle database, the ID of the vehicle, the optimum beam pair, and the intensity of the reference signal of the first electronic device 2603.

At any time, the third electronic device 2607 can transmit, to the RSU 2601, the measurement report message including the ID of the vehicle, the optimum beam pair, and the reference signal reception intensity in operation 2627. The RSU 2601 can register a vehicle of the third electronic device 2607 in operation 2629. For example, the RSU 2601 can register, in the vehicle database, the ID of the vehicle, the optimal beam pair, and/or the intensity of the reference signal of the third electronic device 2607.

The RSU 2601 can again detect that there are a plurality of registered vehicles, and identify whether there are vehicles, from among a plurality of vehicles, entering an intersection from different directions on the basis of an optimum beam pair of each of the plurality of vehicles. In an embodiment of the present disclosure, the RSU 2601 can detect that the vehicle of the second electronic device 2605 and the vehicle of the third electronic device 2607 enter an intersection from different directions, on the basis of the optimum beam pair. When it is detected that the vehicle of the second electronic device 2605 and the vehicle of the third electronic device 2607 are entering the intersection from different directions, the RSU 2601 can transmit a notification message to the second electronic device 2605 and the third electronic device 2607 in operation 2633 and in operation 2631, respectively. At this time, since the vehicle of the first electronic device 2603 is unregistered, the RSU 2601 does not transmit, to the first electronic device 2603, a message indicating that there is a vehicle entering the corresponding first electronic device 2603 from different directions. The registration and unregistration of vehicles can be continuously performed, for any number of vehicles, and the limited sequential operations of FIG. 26 are for illustrations purposes.

Figures 27A, 27B, 27C:
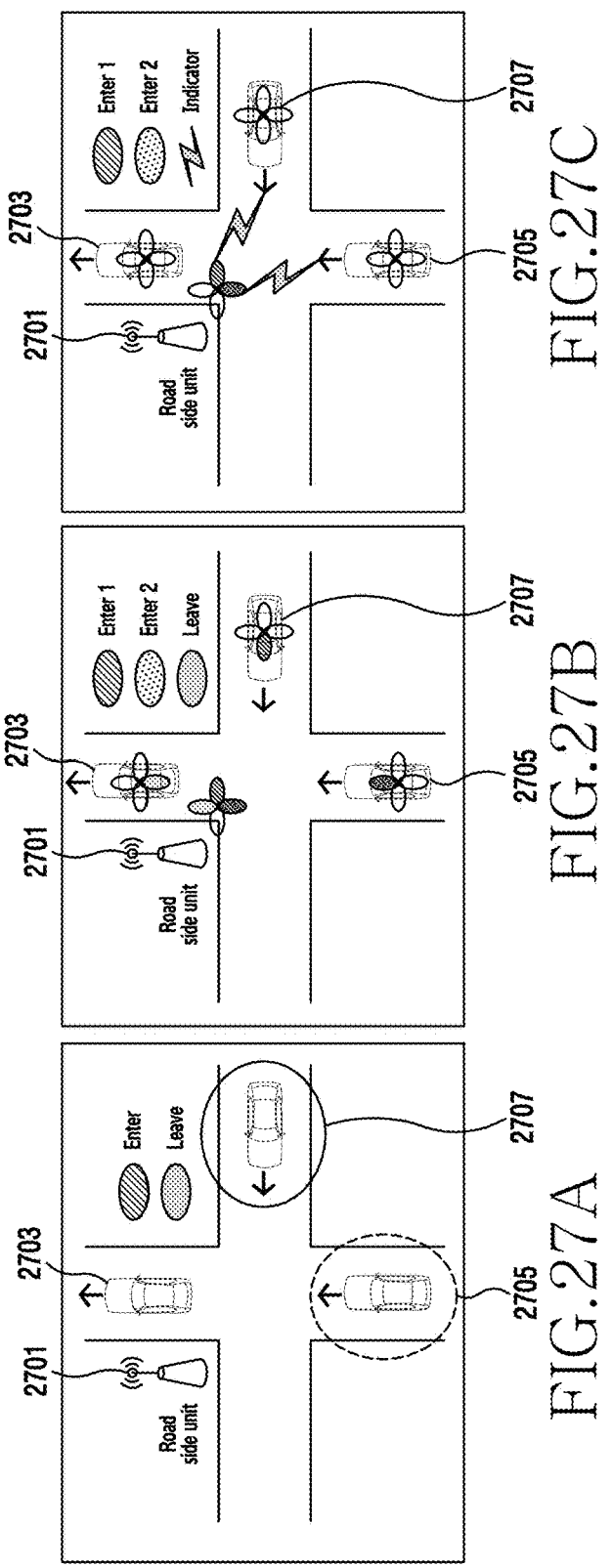
FIGS. 27A to 27C illustrate examples of providing driving-related information of another vehicle to vehicles having a collision probability by an RSU according to another embodiment of the present disclosure.

FIGS. 27A to 27C illustrate examples of providing driving-related information of another vehicle to vehicles having a collision probability by an RSU according to another embodiment of the present disclosure.

Referring to FIGS. 26 and 27A, the RSU 2701 can identify that a vehicle 2703 of the first electronic device 2603 exits from an intersection and a vehicle 2705 of the second electronic device 2605 and a vehicle 2707 of the third electronic device 2607 enter the intersection, on the basis of the vehicle registration information. Referring to FIGS. 26 and 27B, the RSU 2701 can identify that the vehicle of the second electronic device 2605 and the vehicle of the third electronic device 2607 enter the intersection from different directions, on the basis of optimum beam pair information between the second electronic device 2605 and the RSU 2701 and optimum beam pair information between the third electronic device 2607 and the RSU 2701 on the basis of the vehicle registration information. Accordingly, referring to FIGS. 26 and 27C, the RSU 2701 can transmit, to the second electronic device 2605 and the third electronic device 2607, a message indicating that there are vehicles entering from different directions, and can advise the vehicle 2705 of the second electronic device 2605 and the vehicle 2707 of the third electronic device 2607 to avoid colliding with each other.

Figure 28:
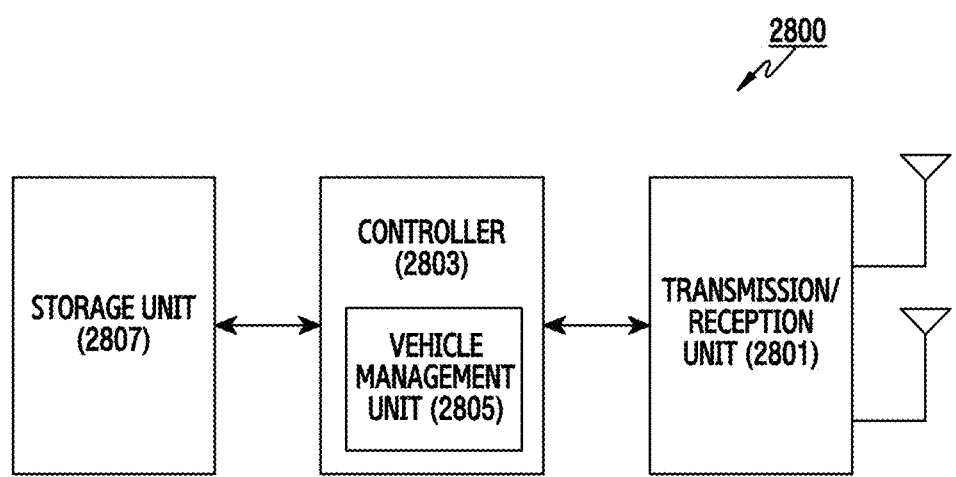
FIG. 28 is a block diagram illustrating an RSU according to another embodiment of the present disclosure.

FIG. 28 is a block diagram illustrating an RSU according to an embodiment of the present disclosure.

Referring to FIG. 28, an RSU 2800 may include a transmission/reception unit 2801, a controller 2803, a storage unit 2807, and one or more antenna.

The transmission/reception unit 2801 can transmit/receive a signal to/from an electronic device of at least one other vehicle. The transmission/reception unit 2801 can transmit/receive a signal through the plurality of antennas according to a control of the controller 2803. Here, an antenna includes a beam antenna capable of beamforming in a specific direction and/or an array antenna. The transmission/reception unit 2801 may include a beamforming module (not illustrated) and may additionally include a plurality of encoders, a plurality of modulators, a plurality of subcarrier wave mappers, a plurality of modulators, and a plurality of RF transmitters. The beamforming module can form a transmission/reception beam requested by the controller 2803 using at least one of digital beamforming, beamforming physically moving an antenna, antennas corresponding to previously-defined beam directions and antenna bundles or antenna arrays.

The controller 2803 controls and processes an overall operation of the RSU 2800, and includes a vehicle management unit 2805 according to an embodiment of the present disclosure. The controller 2803 or the vehicle management unit 2805 also registers a vehicle by detecting the corresponding vehicle entering an intersection or a road where the RSU 2800 is installed, on the basis of the measurement report message received from an electronic device of the vehicle, and controls and processes a function for unregistering the corresponding vehicle by detecting that the registered vehicle exits from the corresponding intersection or road. For example, the vehicle management unit 2805 can transmit a reference signal while changing a transmission beam in order to determine an optimum transmission/reception beam pair in an electronic device located in the intersection or road where the RSU 2800 is installed. According to an embodiment of the present disclosure, a reference signal can be transmitted while including a beam index of the corresponding transmission beam. The vehicle management unit 2805 can control the RSU to periodically or aperiodically perform an operation of transmitting the reference signal while changing the transmission beam. According to an embodiment of the present disclosure, the vehicle management unit 2805 can control the RSU to transmit a reference signal in all transmission beam directions which can be formed in the beamforming module of the transmission/reception unit 2801 and can control the RSU to transmit a reference signal using a plurality of predetermined transmission beam directions.

When receiving the measurement report message from the electronic device of the vehicle, the vehicle management unit 2805 can register/unregister the corresponding vehicle in/from the vehicle database on the basis of the optimum beam pair and the intensity of the reference signal, which are included in the measurement report message. In this case, the vehicle database includes a database including information on a vehicle entering an intersection or a road where the RSU 2800 is installed but embodiments are not limited thereto. For example, when the ID of the vehicle included in the measurement report message is not registered in the vehicle database, the vehicle management unit 2805 can detect that the corresponding vehicle is entering the corresponding intersection and the corresponding road, and register, in the vehicle database, the corresponding ID of the vehicle, the optimum beam pair, and the intensity of the reference signal. As another example, when the ID of the vehicle included in the measurement report message is registered in the vehicle database, the vehicle management unit 2805 can determine whether the corresponding vehicle is registered or unregistered, on the basis of the optimum beam pair and the intensity of the reference signal, which are included in the measurement report message. For example, the vehicle management unit 2805 can detect whether the corresponding vehicle exits from the corresponding intersection or the corresponding road, on the basis of the previously-determined beam pair and the currently-determined beam pair included in the measurement report message, the reception intensity of the previous reference signal and the reception intensity of the current reference signal. As another example, the vehicle management unit 2805 can detect whether the corresponding vehicle is exiting from the corresponding intersection or the corresponding road, by comparing the optimum beam pair and the intensity of the reference signal, included in the measurement report message, with an optimum beam pair and an intensity of a reference signal, previously registered in the vehicle database with regard to the corresponding ID of the vehicle. The vehicle management unit 2805 can identify whether the optimum beam pair of the corresponding vehicle is changed, on the basis of the measurement report message, and when the optimum beam pair of the corresponding vehicle is changed, determine that the vehicle is exiting from the corresponding intersection or the corresponding road. When it is determined that the corresponding vehicle is exiting from the corresponding intersection or the corresponding road, the vehicle management unit 2805 can delete information on the corresponding vehicle from a vehicle database.

Further, when information of a specific vehicle is registered in the vehicle database, the vehicle management unit 2805 identifies whether there is another vehicle registered in the vehicle database in advance. When there is another pre-registered vehicle, the vehicle management unit 2805 can identify whether there are a plurality of vehicles entering the intersection. For example, when there are a plurality of vehicles registered in the vehicle database, the vehicle management unit 2805 can identify whether there are a plurality of vehicles entering the intersection from among a plurality of vehicles registered in the vehicle database. When the plurality of vehicles enter the intersection, the vehicle management unit 2805 can control a function of transmitting a notification message to a plurality of vehicles entering the intersection. The notification message may be a message indicating that there is a vehicle entering the corresponding intersection or the corresponding road from a different direction.

The storage unit 2807 stores various programs and data for an overall operation of the RSU 2800. The storage unit 2807 can store a command or data which is received from or generated by the controller 2803 or other components. The storage unit 2807 according to an embodiment of the present disclosure may include a vehicle database for storing information on a vehicle entering the intersection or the road where the RSU 2800 is installed. The vehicle database may include an ID of a vehicle, an optimum beam pair, and/or a reference signal reception intensity entering an intersection or a road where the RSU 2800 is installed.

Figure 29:
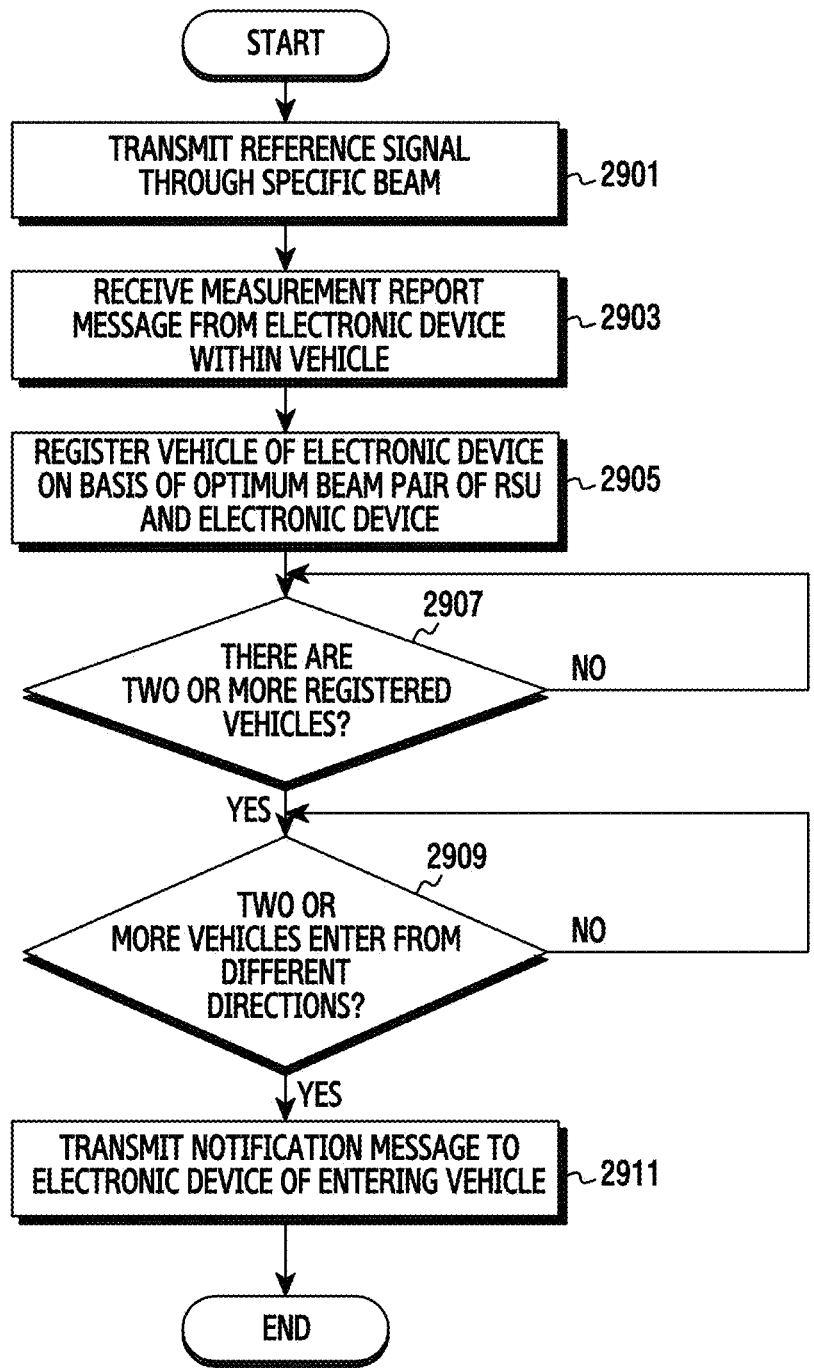
FIG. 29 is a flowchart illustrating a procedure of an RSU according to another embodiment of the present disclosure.

FIG. 29 is a flowchart illustrating a procedure of an RSU according to an embodiment of the present disclosure.

Referring to FIG. 29, the RSU 2800 transmits a reference signal through a specific beam in operation 2901. For example, the RSU 2800 can change a transmission beam according to a predetermined scheme while transmitting the reference signal through the changed transmission beam. According to an embodiment of the present disclosure, while changing the transmission beam, the operation of transmitting the reference signal can be periodically or aperiodically performed.

The RSU 2800 can receive a measurement report message from an electronic device of a vehicle in operation 2903, and register the vehicle of the electronic device on the basis of an optimum beam pair of the RSU 2800 and the electronic device in operation 2905. According to an embodiment of the present disclosure, when receiving the measurement report message from the electronic device of the vehicle, the RSU 2800 can register the corresponding vehicle in the vehicle database on the basis of the optimum beam pair and the intensity of the reference signal, which are included in the measurement report message. Here, the vehicle database includes a database including information on a vehicle entering an intersection or a road where the RSU 2800 is installed. For example, when the ID of the vehicle included in the measurement report message is not registered in the vehicle database, the RSU 2800 can detect that the corresponding vehicle is entering the corresponding intersection or the corresponding road, and register, in the vehicle database, the corresponding ID of the vehicle, the optimum beam pair, and/or the intensity of the reference signal.

Thereafter, the RSU 2800 can identify whether there are two or more registered vehicles in operation 2907. According to an embodiment of the present disclosure, when information of a vehicle is registered in the vehicle database, the RSU 2800 identifies whether there is another vehicle registered in the vehicle database in advance. According to an embodiment of the present disclosure, the RSU 2800 can identify whether a plurality of vehicles, including a vehicle to be currently registered in the vehicle database, is registered.

When there are two or more registered vehicles, the RSU 2800 can identify whether two or more vehicles enter from different directions in operation 2909. According to an embodiment of the present disclosure, the RSU 2800 can identify whether there are a plurality of vehicles entering the intersection. For example, when there are vehicles registered in the vehicle database, the RSU 2800 can identify whether there are a plurality of vehicles entering the intersection from among a plurality of vehicles registered in the vehicle database, on the basis of the optimum beam pair of each vehicle.

When there are not two or more registered vehicles, the RSU 2800 can identify whether there are two or more vehicles registered in a database whenever a vehicle is newly registered in the vehicle database.

When there are two or more vehicles entering from different directions, in operation 2909, the RSU 2800 can transmit a notification message to an electronic device of an entering vehicle in operation 2911. According to an embodiment of the present disclosure, when a plurality of vehicles enter an intersection, the RSU 2800 can transmit the notification message to the plurality of vehicles entering the intersection. The notification message may be a message indicating that there is a vehicle entering the corresponding intersection or entering the corresponding road from a different direction.

Figure 30:
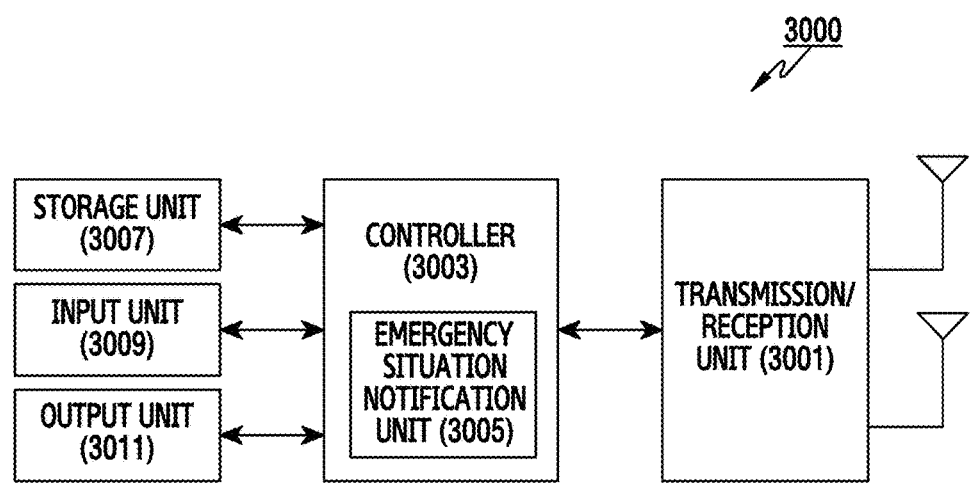
FIG. 30 is a block diagram illustrating an electronic device of a vehicle according to another embodiment of the present disclosure.

FIG. 30 is a block diagram illustrating an electronic device of an emergency vehicle according to an embodiment of the present disclosure.

Referring to FIG. 30, an electronic device 3000 of a vehicle may include a transmission/reception unit 3001, a controller 3003, a storage unit 3007, an input unit 3009, an output unit 3011, and one or more antenna.

The transmission/reception unit 3001 can transmit/receive a signal to/from an RSU 2800 of at least one other vehicle. The transmission/reception unit 3001 can transmit/receive a signal through a plurality of antennas according to a control of the controller 3003. Here, an antenna includes a beam antenna capable of beamforming in a specific direction and/or an array antenna. The transmission/reception unit 3001 may include a beamforming module (not illustrated) and may additionally include a plurality of encoders, a plurality of modulators, a plurality of subcarrier wave mappers, a plurality of modulators, and a plurality of RF transmitters. The beamforming module of the vehicle electronic device 3000 can form a transmission/reception beam requested by the controller 2803 of the RSU 2800 using at least one of digital beamforming, beamforming by physically moving an antenna, antennas corresponding to previously-defined beam directions, previously, and antenna bundles or antenna arrays.

The controller 3003 can control and process an overall operation of the electronic device 3000 of the vehicle, and may include an emergency situation notification unit 3005 according to embodiments of the present disclosure. The controller 3003 or the emergency situation notification unit 3005 can also attempt to receive a reference signal from the RSU 2800 while changing a transmission beam by activating a receiver function of the transmission/reception unit 3001, when the RSU 2800 exists on a path to a destination. The emergency situation notification unit 3005 can generate a measurement report message on the basis of a result of receiving the reference signal, report the generated measurement report message to the RSU 2800, and receive, from the RSU 2800, a message indicating that another vehicle is entering the corresponding intersection or the corresponding road.

According to an embodiment of the present disclosure, the emergency situation notification unit 3005 can identify whether the RSU 2800 exists on a path to a destination, set by a user input. For example, the electronic device 3000 can determine whether the RSU 2800 exists on the path to the destination of the electronic device 3000, using a navigation function provided therein or a navigation service provided by another apparatus interworking with the electronic device 3000. When a receiver function of the transmission/reception unit 3001 is activated and the receiver is activated, the emergency situation notification unit 3005 can attempt to receive a reference signal from an RSU 2800 while changing a reception beam of the receiver. The emergency situation notification unit 3005 can determine a reception beam through which a reference signal stronger than a threshold intensity is received, on the basis of a result of attempting to receive the reference signal while changing the reception beam, and determine an optimum beam pair corresponding thereto. For example, the emergency situation notification unit 3005 can determine the reception beam through which the reference signal having an intensity stronger than the threshold intensity on the basis of a result of attempting to receive the reference signal while changing the reception beam, and determine a beam pair configured by a transmission beam index and a reception beam index, by distinguishing the transmission beam index of the RSU 2800 from the reference signal received through the determined reception beam. According to an embodiment of the present disclosure, the emergency situation notification unit 3005 may attempt to receive the reference signal in all reception beams which can be formed by the receiver or may attempt to receive the reference signal using the plurality of predetermined reception beam directions. The emergency situation notification unit 3005 transmits a measurement report message indicating a result of measuring the reference signal received through the optimum beam pair. The measurement report message may include the ID of the vehicle, the determined beam pair, and/or reception intensity information of the reference signal of the electronic device 3000.

Further, when a message notifying that there is a vehicle entering from a different direction is received from the RSU 2800, the emergency situation notification unit 3005 can perform a function for notifying a user that there is the vehicle entering from a different direction. For example, the emergency situation notification unit 3005 can control the electronic device 3000 to output a display notifying a user that there is a vehicle entering from a different direction, through the output unit 3011, or can control the electronic device 3000 to output an audio signal indicating that there is a vehicle entering from a different direction.

The storage unit 3007 stores various programs and data for an overall operation of the electronic device 3000. The storage unit 3007 can store a command or data which is received from or generated by the controller 3003 or other components. The storage unit 3007 according to an embodiment of the present disclosure can store an ID of a vehicle, an optimum beam pair, and/or a reception intensity of a reference signal. The storage unit 3007 may be a memory including programming modules such as a kernel, middleware, an API, an application, etc. According to an embodiment of the present disclosure, each of the programming modules may be implemented by software, firmware, hardware, or a combination of two or more thereof.

The input unit 3009 provides, to the controller 3003, data input from a user of the electronic device 3000. For example, the input unit 3009 may include a keypad including at least one key button, a touch pad or touch sensor for detecting a touch input of a user, a microphone for receiving input of voice of a user, a physical function key button mapped to a specific function, etc. The input unit 3009 according to an embodiment of the present disclosure can acquire, from a user, the information on the destination (e.g., destination address information, destination name information, etc.).

The output unit 3011 can display various pieces of information and graphical elements generated during an operation of the electronic device 3000 or output an audio signal. For example, the output unit 3011 can include a display for displaying the command or data received from the controller 3003 or the other components. For example, the output unit 3011 can display a screen on which an input of the destination of the electronic device 3000 is required and display a map indicating the path from the current location of the electronic device 3000 to the destination thereof. Additionally, the output unit 3011 can display information indicating that the RSU 2800 exists on a path of the electronic device 3000. Further, the output unit 3011 can display a message or graphic element indicating that there is another vehicle entering an intersection or road where the electronic device 3000 has entered. In addition, the output unit 3011 can include an audio output unit for outputting, as an audio signal, the command or data received from the controller 3003 or the other components. For example, the output unit 3011 can output an audio signal indicating that there is another vehicle entering an intersection or road where the electronic device 3000 has entered.

Figure 31:
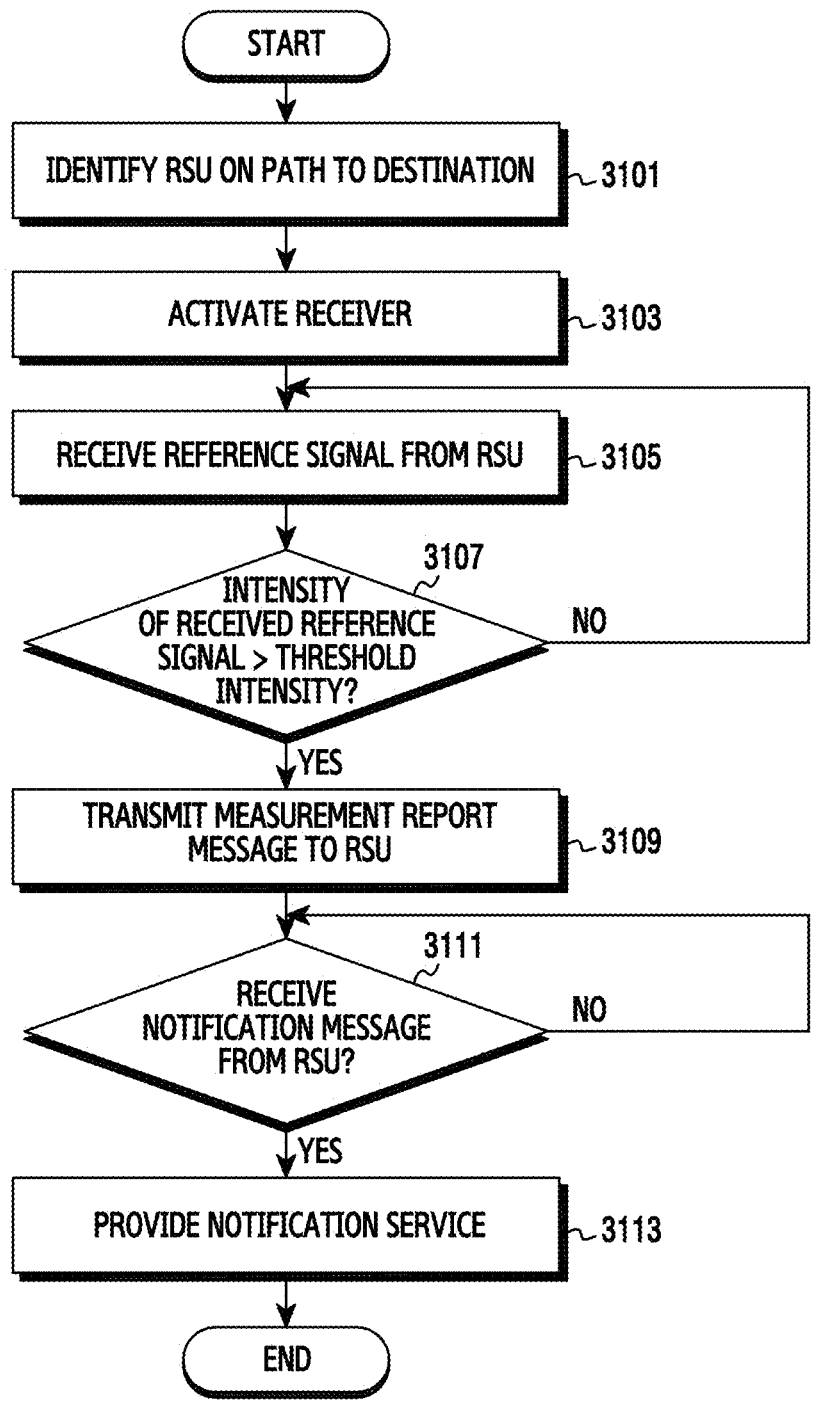
FIG. 31 is a flowchart illustrating a procedure of an electronic device of a vehicle according to another embodiment of the present disclosure.

FIG. 31 is a flowchart illustrating a procedure of an electronic device of a vehicle according to an embodiment of the present disclosure.

Referring to FIG. 31, an electronic device of a vehicle can identify the RSU 2800 on a path to a destination in operation 3101. According to an embodiment of the present disclosure, the electronic device of the vehicle can identify whether the RSU 2800 exists on a path to a destination, set by a user input. The electronic device of the vehicle can identify whether the RSU 2800 exists on the path to the destination to the electronic device, using a navigation service provided in the electronic device.

The electronic device of the vehicle can activate a receiver in operation 3103. The electronic device of the vehicle can activate a receiver function, and attempt to receive a reference signal from the RSU 2800 in operation 3105 while changing the reception beam of the receiver when the receiver is activated.

Thereafter, the electronic device of the vehicle can identify whether the intensity of the received reference signal is stronger than a threshold intensity in operation 3107. The electronic device of the vehicle can identify whether there is a beam received wherein the intensity of the reference signal of the beam is stronger than a threshold intensity, when attempting to receive a reference signal while changing a reception beam.

When there is a beam received wherein the intensity of the reference signal of the beam is stronger than a threshold intensity, the electronic device of the vehicle can transmit the measurement report message to the RSU 2800 in operation 3109. The electronic device of the vehicle can determine whether a reception beam, through which a reference signal having an intensity stronger than a threshold intensity is received, on the basis of a result of attempting to receive the reference signal while changing the reception beam, and determine an optimum beam pair corresponding thereto. For example, the electronic device of the vehicle can determine the reception beam, through which the reference signal having an intensity stronger than the threshold intensity is received, on the basis of a result of attempting to receive the reference signal while changing the reception beam, and determine a beam pair configured by a transmission beam index and a reception beam index, by distinguishing the transmission beam index of the RSU 2800 from the reference signal received through the determined reception beam. According to an embodiment of the present disclosure, the electronic device of the vehicle may attempt to receive the reference signal in all reception beams which can be formed by the receiver or may attempt to receive the reference signal using the plurality of predetermined reception beam directions. The electronic device of the vehicle transmits a measurement report message indicating a result of measuring the reference signal received through the optimum beam pair. The measurement report message may include the ID of the vehicle, the determined beam pair, and/or the reception intensity of the reference signal of the electronic device 3000.

When there is no beam received having an intensity of the reference signal stronger than a threshold intensity, the electronic device of the vehicle can again receive a reference signal from the RSU 2800.

The electronic device of the vehicle can identify whether a notification message is received from the RSU 2800 in operation 3111. According to an embodiment of the present disclosure, the electronic device of the vehicle can identify whether a message notifying that a vehicle is entering from a different direction is received from the RSU 2800.

When the notification message is received from the RSU, the electronic device of the vehicle can provide a notification service in operation 3113. When a message notifying that there is a vehicle entering from a different direction is received from the RSU 2800, the electronic device of the vehicle can perform a function for notifying a user that there is the vehicle entering from a different direction. For example, the electronic device of the vehicle can display a notification message notifying a user that there is a vehicle entering from a different direction and/or can output an audio signal indicating that there is a vehicle entering in the different direction.

If the notification message is not received from the RSU 2800, the electronic device of the vehicle can continue to identify whether the notification message is received until the notification message is received from the RSU 2800.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method of an electronic device, the method comprising:
    setting a path from a current location of an electronic device to a destination;
    receiving, from at least one other device located on the path, a reference signal through a plurality of reception beams;
    determining a transmission/reception beam pair of the electronic device and the at least one other device based on the reference signal, wherein the determined transmission/reception beam pair corresponds to a reception beam from among the plurality of reception beams through which the reference signal has a reception power stronger than a predetermined threshold;
    transmitting, to the at least one other device, a signal including identification information of the electronic device, information for the determined transmission/reception beam pair and information for the reception power of the reference signal to indicate whether the electronic device approaches a road position in the path; and
    transmitting, to the at least one other device, a message indicating an emergency situation while moving to the destination using the determined transmission/reception beam pair.

2. The method of claim 1, further comprising:
acquiring information for the at least one other device; and
requesting a traffic signal control from the at least one other device on the basis of the information while moving to the destination,
wherein the information for the at least one other device comprises at least one of a location of the at least one other device, identification information of the at least one other device, and an authentication key for the at least one other device.

3. The method of claim 2, wherein the message indicating the emergency situation comprises at least one of:
speed information of the electronic device,
current location information of the electronic device,
path information from a current location of the electronic device to a destination,
service type information for the emergency situation,
identification information of the at least one other device, and
authentication information of the at least one other device.

4. The method of claim 2, wherein the transmitting of the message indicating the emergency situation to the at least one other device located on the path comprises:
transmitting the message indicating the emergency situation to the at least one other device on the basis of a distance between the electronic device and the at least one other device.

5. A method of a traffic server, the method comprising:
transmitting, to an electronic device, a reference signal through a plurality of transmission beams;
receiving, from the electronic device, a signal including identification information of the electronic device, information for a transmission/reception beam pair determined based on the reference signal and information for a reception power of the reference signal, wherein the transmission/reception beam pair corresponds to a transmission beam from among the plurality of transmission beams through which the reference signal has the reception power stronger than a predetermined threshold;
receiving, from the electronic device, current location information and destination information of the electronic device using the transmission/reception beam pair;
setting a path of the electronic device on the basis of the current location information and the destination information;
determining whether the electronic device approaches a road position in the path based on the identification information of the electronic device, the information for a transmission/reception beam pair and the information for the reception power of the reference signal;
acquiring information on at least one traffic signal control apparatus located on the road position when the electronic device approaches the road position; and
transmitting, to the electronic device, information on the path and the at least one traffic signal control apparatus,
wherein the information on the traffic signal control apparatus comprises at least one of:
a location of the at least one traffic signal control apparatus,
identification information of the at least one traffic signal control apparatus, and
an authentication key of the at least one traffic signal control apparatus.

6. An electronic device comprising:
a transmission/reception unit; and
a controller,
wherein the controller is configured to:
set a path from a current location of the electronic device to a destination,
control the transmission/reception unit to receive, from at least one other device located on the path, a reference signal through a plurality of reception beams,
determine a transmission/reception beam pair of the electronic device and the at least one other device based on the reference signal, wherein the determined transmission/reception beam pair corresponds to a reception beam from among the plurality of reception beams through which the reference signal has a reception power stronger than a predetermined threshold,
control the transmission/reception unit to transmit, to the at least one other device, a signal including identification information of the electronic device, information for the determined transmission/reception beam pair and information for the reception power of the reference signal to indicate whether the electronic device approaches a road position in the path, and
control the transmission/reception unit to transmit, to the at least one other device, a message indicating an emergency situation while moving to the destination using the determined transmission/reception beam pair.

7. The electronic device of claim 6, wherein the controller is further configured to:
acquire information for the at least one other device, and
request a traffic signal control from the at least one other device on the basis of the acquired information while moving to the destination,
wherein the information for the at least one other device comprises at least one of a location of the at least one other device, identification information of the at least one other device, and an authentication key for the at least one other device.

8. The electronic device of claim 7, wherein the message indicating the emergency situation comprises at least one of:
speed information of the electronic device,
current location information of the electronic device,
path information from the current location of the electronic device to the destination,
service type information for the emergency situation,
identification information of the other device, and
authentication information of the other device.

9. The electronic device of claim 7, wherein the controller is further configured to:
transmit a message indicating an emergency situation to the at least one other device on the basis of a distance between the electronic device and the at least one other device.

10. A traffic server comprising:
a transmission/reception unit; and
a controller,
wherein the controller is configured to:
control the transmission/reception unit to transmit, to an electronic device, a reference signal through a plurality of transmission beams,
control the transmission/reception unit to receive, from the electronic device, a signal including identification information of the electronic device, information for a transmission/reception beam pair determined based on the reference signal and information for a reception power of the reference signal, wherein the transmission/reception beam pair corresponds to a transmission beam from among the plurality of transmission beams through which the reference signal has the reception power stronger than a predetermined threshold, control the transmission/reception unit to receive, from the electronic device, current location information and destination information of the electronic device using the transmission/reception beam pair, set a path of the electronic device on the basis of the current location information and the destination information, determine whether the electronic device approaches a road position in the path based on the identification information of the electronic device, the information for a transmission/reception beam pair and the information for the reception power of the reference signal, acquire information on at least one traffic signal control apparatus located on the road position when the electronic device approaches the road position, and transmit, to the electronic device, the path and the information on the at least one traffic signal control apparatus, wherein the information on the traffic signal control apparatus comprises at least one of:
  a location of the at least one traffic signal control apparatus,
  identification information of the at least one traffic signal control apparatus, and
  authentication key of the at least one traffic signal control apparatus.

* * * * *